(12) United States Patent
Crouch et al.

(10) Patent No.: US 7,348,796 B2
(45) Date of Patent: Mar. 25, 2008

(54) METHOD AND SYSTEM FOR NETWORK-ON-CHIP AND OTHER INTEGRATED CIRCUIT ARCHITECTURES

(75) Inventors: Alfred L. Crouch, Cedar Park, TX (US); Peter L. Levin, Newtonville, MA (US); Paul A. Bradley, Cumberland, RI (US)

(73) Assignee: DAFCA, Inc., Framingham, MA (US)

( * ) Notice: Subject to any disclaimer, the term of this patent is extended or adjusted under 35 U.S.C. 154(b) by 242 days.

(21) Appl. No.: 11/258,661

(22) Filed: Oct. 26, 2005

(65) Prior Publication Data

US 2007/0113123 A1   May 17, 2007

(51) Int. Cl.
 *G06F 7/38* (2006.01)
 *H03K 19/173* (2006.01)

(52) U.S. Cl. ............................. 326/38; 326/39; 326/41

(58) Field of Classification Search ............ 326/38–41, 326/47
See application file for complete search history.

(56) References Cited

U.S. PATENT DOCUMENTS 7,058,918 B2 *   6/2006   Abramovici et al. .......... 716/12

\* cited by examiner

*Primary Examiner*—Anh Q. Tran
(74) *Attorney, Agent, or Firm*—Mark G. Lappin; Foley & Lardner LLP

(57) ABSTRACT

A method and system is provided for Network-on-Chip (NoC) and other integrated circuit architectures. A configurable fabric circuit (CFC) is interfaced with one or more core circuits and the CFC is responsive to an input signal and capable of reconfiguring the logic circuit in the CFC in accordance with an operational mode determined based on the received input signal to facilitate a core circuit interfaced therewith to carry out an operation consistent with the operational mode.

57 Claims, 21 Drawing Sheets

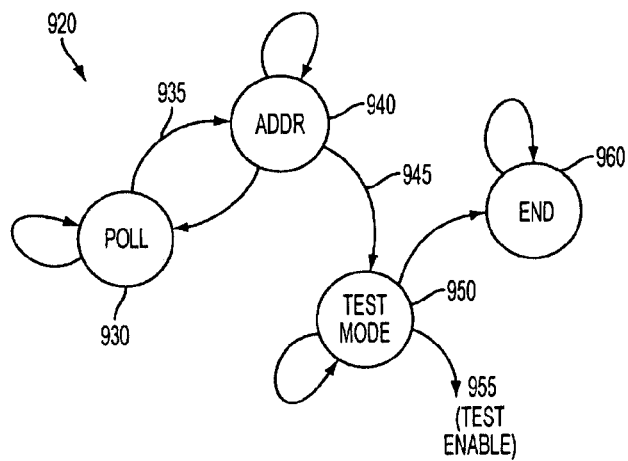
FIG. 9(a)
| $Q_A$ | $Q_B$ | STATE |
|---|---|---|
| 0 | 0 | POLL |
| 1 | 0 | ADDR |
| 0 | 1 | TEST MODE |
| 1 | 1 | END |
FIG. 9(b)
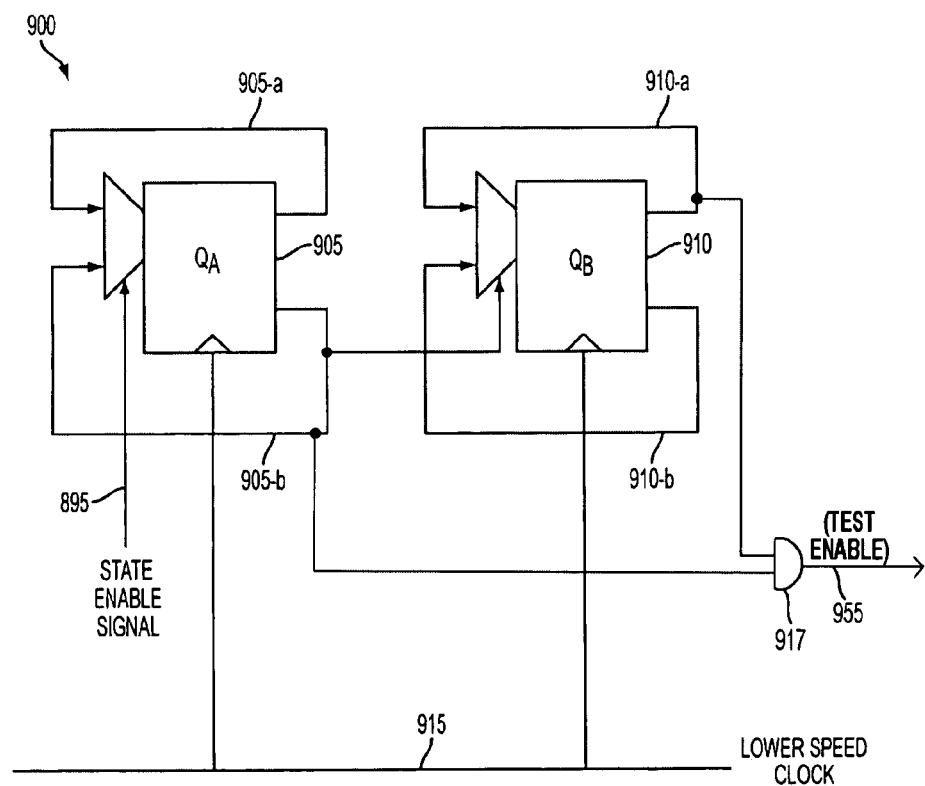
FIG. 9(c)

METHOD AND SYSTEM FOR NETWORK-ON-CHIP AND OTHER INTEGRATED CIRCUIT ARCHITECTURES

BACKGROUND

1. Field of Invention

The present invention presented herein relates to integrated circuits. More specifically, the present invention relates to configurable integrated circuits and methods and systems having the present invention incorporated therein.

2. Discussion of Related Art

Recent advancement in the semiconductor industry has led to higher and higher levels of integration in integrated circuits within smaller physical structures. Much of what used to be board level circuitry and even complete systems has now been moved within a single chip in a class of chips known as systems-on-a-chip (SoC). The impetus for incorporating more and more circuitry and functions within single chips include the design goals of reduced size (more functionality within a reduced footprint), more performance (higher operating clock frequency as well as more operations per clock interval), reduced consumption of power (using a lower voltage or current thereby enabling longer battery life or less thermal impact), and targeted market stipulations. The overriding goal, however, is reduced system cost.

One of such SoCs that has recently become possible to manufacture is the concept of network-on-chip (NoC). An NoC embeds a plurality of routers operating on high-speed network signals and a plurality of processing elements (generally known as cores) connected to the routers in a single silicon die. The challenge in testing a SoC, an NoC included, is how to access an embedded core, manipulate a core in a test mode, deliver test vectors to a core to be tested, extract test results from a core, and schedule the testing in such a way as that a test can be carried out within the bounds of various parameters such as a budgeted test time, the thermal or power handling capabilities of the chip or the package, and the capabilities of an automatic test equipment (ATE).

Manufacturing test in semiconductor integrated circuits has evolved over twenty years from fault-graded functional or operational vectors to structural tests such as scan and pattern-generator-based built-in-self-test (BIST). One motivation to move away from testing using functional vectors is related to the long delivery time required to produce and fault-simulate functional vectors as well as the large amount of functional vectors usually required to achieve acceptable quality and to provide coverage for different fault classes. Structural vectors are comparatively much more efficient in delivery time, quality assessment, and are easier to apply. This is especially true in designs that employ embedded IP cores due to the fact that structural vectors are portable, can be delivered with the core and reused, and can be applied to an embedded core through a minimized test interface instead of using the now-untenable approach of providing test-only access pathways to all of the core's functional ports from the final packaged device's pin map.

However, the complexity and size of modern SoC designs have created new challenges in testing, even when structural vectors are used. The design of test access mechanisms (TAM) for optimized access to ports of embedded cores (commonly referred to as a core wrapper) and the scheduling matrix that controls which core receives test vectors at what time is known as DFT (design-for-test) and is carried out at a pre-mask or pre-silicon stage (i.e., during the design development or design creation period) of a creation cycle. Once a DFT architecture (i.e., a test access architecture that enables selection of an individual core, memory, or logic grouping for testing) is established, the test scheduling aspect of a manufacturing test program is accordingly fixed or limited. For example, if eight package pins are used as scan inputs to two different cores and another eight pins are multiplexed to receive the scan outputs of those two cores, it is impossible for the two cores to be tested simultaneously since they share scan data pathways and only one can use the pathways at any given time. In addition, a SoC is tested in a test-mode so that vectors delivered while in a test mode are all interpreted as test vectors. Therefore, it is impossible to test a SoC in-situ in a final system without disrupting its functional operation.

There are other limitations associated with use of structural vectors and such limitations drive DFT architecture decisions. One of such limitations relates to power consumption. Such scan vectors are much more active than functional operational vectors because they often directly toggle flip-flops on each active clock edge. In a normal functional mode, an integrated circuit may be designed to support up to 30% of toggle rate (the number of flip-flops that change state on an active clock edge). In a test mode, however, scan can be applied with a 100% toggle rate (e.g., by shifting the <. . . 010101 . . . > pattern through the scan chain). As a result, a scan vector in a test mode may be partitioned into two operations corresponding to "shift" and "sample". Since a vector is usually shifted at a much lower frequency, the "shift" data rate scanned into a device that operates at 400 MHz is generally only around 50 MHz or less. However, the "sample" operations may still be carried out at an operational frequency of 400 MHz. Even though test scan architectures may be configured to access only a few cores at a time, the inherent high-toggle or high-frequency vectors may nevertheless exceed the ICs power handling capability, which further limits the testing capability.

Another limitation to an efficient structural test or DFT architecture driver is the number and type of package interface pins that are available. Test scan access has traditionally borrowed functional pins as the test interface because adding dedicated package interface solely for testing is economically abhorrent. So, a scan test architecture is often developed by temporarily assuming operational control of the functional input and output pins. On the input side, parallel connections and blocking gates prevent random toggling of unused or non-targeted logic blocks. On the output side, since there are usually multiplexers that pass only certain targeted data to the output pins, the pins selected for outputting test result must meet the requirements of the targeted scan shift-rate, which, due to power consumption considerations, are relatively slow pins (e.g., in the 50 MHz to 100 MHz range). So, this also further limits the testing capability.

Recently, there have been several innovations in functional data bandwidth management for ICs. One advancement is the use of high-speed interfaces such as LVDS SerDes (Low Voltage Differential Signals that pass through Serializer-Deserializer functions) that support certain defined bus protocols such as PCI-express and operate at gigahertz frequencies with gigabit data rates. Another advancement is the network-on-chip (NoC) that uses similar high-speed network busses and dedicated routers for interconnect between cores within the NoC. These chip and internal interfaces have created new challenges for structural scan-based and pattern-generator-based BIST testing.

One of the most serious challenges relates to devices that have a wealth of high-speed package pins yet very few relatively low-speed pins. Since current scan architectures deliver or shift scan data at much lower frequencies, the scarcity of low-speed pins limits the scan data bandwidth to just a few pins. Having limited test access pins on huge and complex devices results in longer application time, longer testing time, longer scan chains, and ultimately, less flexibility if a scan chain is broken. Similarly, inside a large scale chip such as an NoC that has a plurality of cores interconnected by high-speed busses, providing an adjustable, flexible, or optimal scan data delivery architecture has become a major part of the design consideration.

A key problem relates to how to get scan data from an ATE to a core embedded in an NoC through the few low-speed test connections. Existing ATEs are not made to deliver scan data at G-Bit SerDes speeds through low-speed test connections to the core embedded in an NoC.

An obvious solution is to add more low frequency pins to the chip interface to enable test access and to provide low-speed scan test connections to the embedded cores. But this can be expensive in that it results in selecting a packaging solution with more pins and thus creates a wealth of test-only routes inside of a chip. In addition, this does not address the complexity of creating the internal device architecture needed to configure the delivery and return of scan data to and from the various cores and logic blocks that are supported on-chip.

Another consideration has to do with security. It has long been known in the industry that scan allows resolution of the internal chip architecture to the register level. That is, each bit that exits a scan chain carries direct information about a bit on the scan chain. The fear is that such direct accesses to the scan connections may make it possible to reverse engineer the internal register map and the logic functions. For both this reason and the scan data volume problem, many semiconductor design organizations have applied some form of vector compression based on, e.g., linear-feedback shift-registers (LFSRs), cellular-automata, or ring-counters. The data to be delivered to an embedded logic within a chip is compressed and later uncompressed into a scan vector.

Even though the compressed data takes fewer bits, it still needs to be delivered in much the same manner as uncompressed scan data. Similarly, even though the scan test results from the various embedded cores can be compressed, such information still needs to be delivered to the edge of the device and ultimately to the ATE in much the same manner as uncompressed scan data.

One further consideration with respect to testing physically large SoCs and/or NoCs is the aspect of redundancy or self-repair (there is a direct correlation between die size and the probability of defects). Embedded testing and repair of memory arrays using built-in self-test (BIST) and by re-configuring extra rows and columns has become a well-adopted technology. Testing and repairing a memory with a self-contained test and repair process is a much more efficient method than dedicated external testing, post-processing of test results, and then using a separate step to configure the repair with a fusible link. In a similar manner, chips have been designed to embed redundant logic elements to enable post-silicon repair. However, prior to logic repair, post-processing of test data is required to determine the location of the failure. It is, therefore, similar to the external memory test method in which either a fusible link or a non-volatile memory element (such as flash memory) is required to enable a permanent or semi-permanent repair. However, such repair is limited to failures that occur within areas that have redundant, configurable, or repairable resources. Therefore, due to the required dedicated testing and post-processing, logic self-repair is still not viable as an in situ solution for devices integrated into their end application.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 9(a)-9(c) illustrate an exemplary state machine in a CFC and exemplary implementation thereof for recognizing different types of events, according to an embodiment of the invention;

DETAILED DESCRIPTION

The present invention involves a configurable fabric circuit (CFC) that, upon intercepting a signal, interprets the signal and reconfigures, accordingly, at least one part of the CFC to perform one or more operations consistent with an operational mode determined based on the intercepted signal. The CFC may be an integral part of an integrated circuit having a designated function, which can be tested, debugged, or monitored. Depending on the content of the signal received, the CFC reconfigures itself both to operate in a functional mode to facilitate the integrated circuit to perform the designated function and to operate in a different mode in which the integrated circuit may be tested, debugged, monitored, or controlled.

Figure 1:
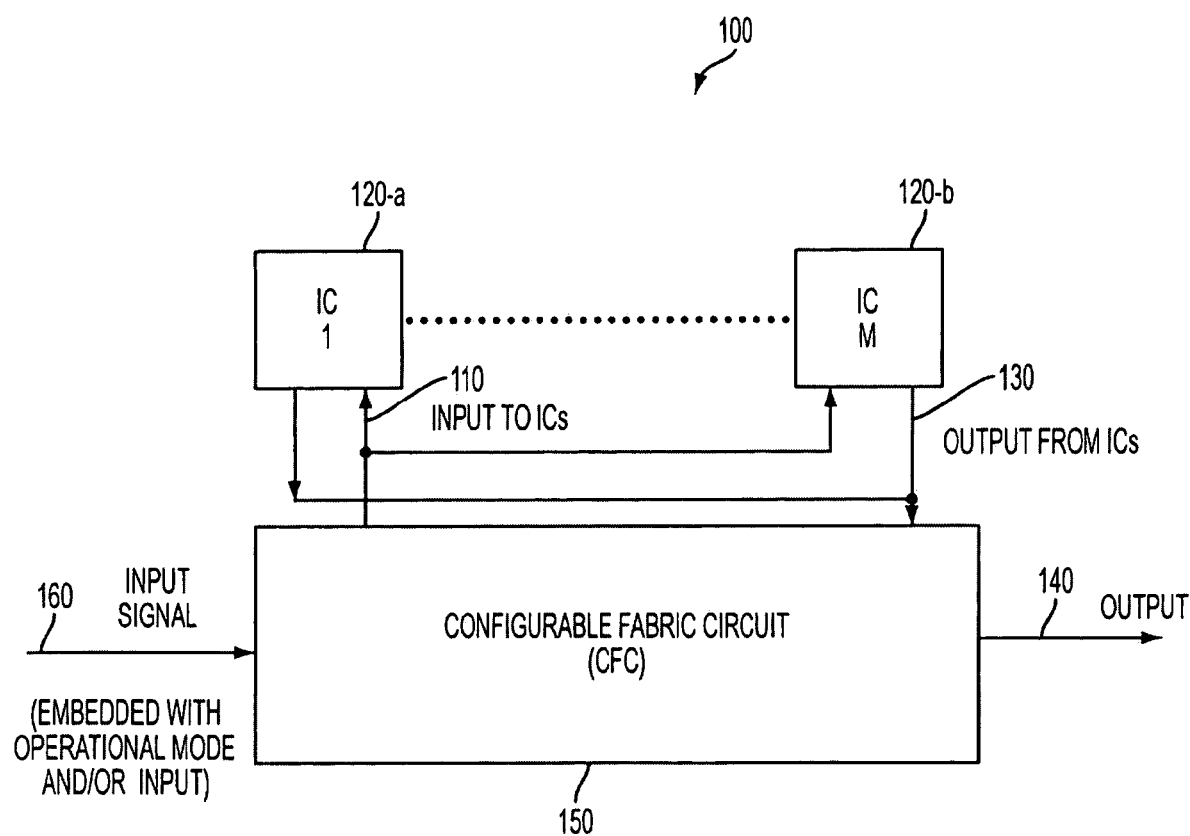
FIG. 1 depicts an exemplary arrangement of a configurable fabric circuit (CFC) and one or more cores coupled therewith, according to an embodiment of the invention.

FIG. 1 depicts an exemplary arrangement 100 of a configurable fabric circuit (CFC) and one or more cores coupled therewith, according to an embodiment of the invention. In the arrangement 100, a configurable fabric circuit (CFC) 150 is coupled with one or more integrated circuits (IC) 120-$a$, ..., 120-$b$. Each of the ICs may be an independent circuit or they may be in connection with each other or even integrated. An IC may correspond to a core designed to perform one or more functions. Each IC may interact with the outside through the CFC 150. For example, the CFC 150 may receive a signal 160 from outside and send some information received to the ICs 120-$a$, ..., 120-$b$ as input 110 to the ICs. Similarly, the ICs 120-$a$, ..., 120-$b$ may send data they generated to the CFC 150 as output 130 so that such data can be sent outside as an output 140 to reach a specific destination.

The CFC 150 may serve a different functional role based on the input signal 160, which may embed different types of information. For example, the input signal 160 may include control information, which may be intercepted and interpreted by the CFC 150 and used to reconfigure its circuitry accordingly. One exemplary type of control information includes an operational mode, which may signal a scenario under which the CFC 150 is to operate. Another exemplary type of control information includes operational parameters, which may provide information associated with an operational mode to be used, for example, to facilitate operations under the given operational mode. Such operational parameters may be directed at the CFC 150. They may also be directed at one or more ICs so that the CFC 150, upon recognizing the same, may parse the information and then pass it on to the ICs.

The input signal 160 may also embed other types of information. For example, data to be used by an IC may be sent to the CFC 150 together with information indicating the destination embedded in the input signal 160 so that the CFC 150 can act accordingly to deliver the data to the designated IC as the input 110.

Upon receiving information from the CFC 150, including control information and/or data, the ICs may process the received information. In some situations, the ICs may send response data as the output data 130 to the CFC 150. The output data 130 sent to the CFC 150 may be further processed to generate the output 140.

The CFC 150 serves as an interface between the ICs 120-$a$, ..., 120-$b$ and may be reconfigured when needed. For example, when the input signal 160 is delivered at a speed different from the speed of the input signal 110 to the ICs, the CFC 150 may dynamically reconfigure itself to at least partially serve as an input converter to facilitate the dual speed interaction between the outside and the ICs. Similarly, if the output from the ICs is delivered at a speed different from the speed requirement of the output 140, the CFC 150 may adaptively reconfigure itself to at least partially serve as an output converter to facilitate the dual speeds.

Figure 2:
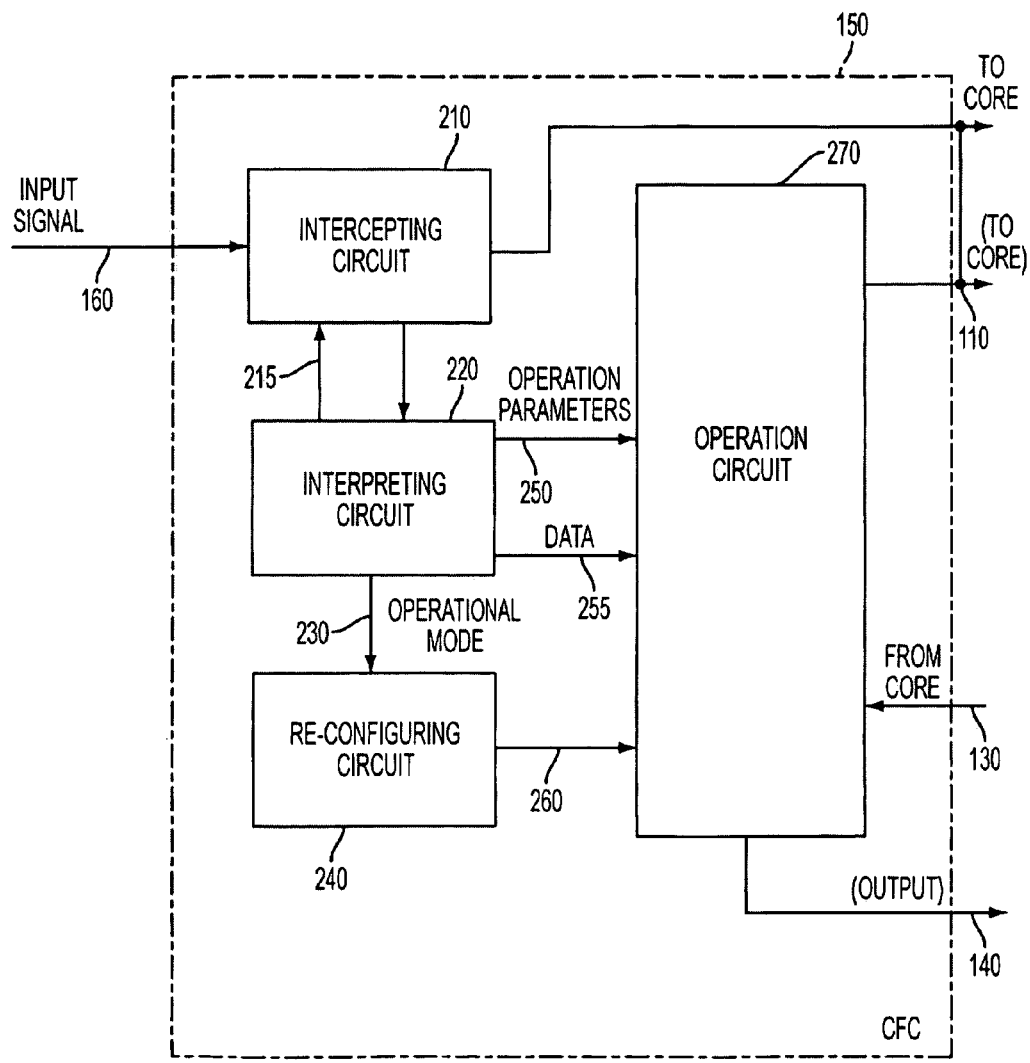
FIG. 2 depicts an exemplary internal structure of a CFC according to an embodiment of the invention.

FIG. 2 depicts an exemplary internal structure of the CFC 150 according to an embodiment of the invention. The CFC 150 may comprise an intercepting circuit 210, an interpreting circuit 220, a re-configuring circuit 240, and an operation circuit 270. The intercepting circuit 210 is configured to intercept the input signal 160. The interception circuit 210 may operate at a different speed when needed. That is, the CFC 150 is capable of re-configuring itself to meet, e.g., the speed requirement of the input signal 160. The intercepted signal may be forwarded to the interpreting circuit 220 which may be configured to parse the received information and derive different types of information from the input signal 160. As discussed above, the input signal 160 may embed control information such as operational mode and operational parameters as well as data information such as computational data or test data.

The interpreting circuit 220 may also direct different parsed information to appropriate destinations. For example, it may forward information related to an operational mode 230 to the re-configuring circuit 240 so that necessary reconfiguration can be performed to facilitate operations under the operational mode. The operation circuit 270 may correspond to a resultant circuit after the reconfiguration performed by the re-configuring circuit 240. That is, the operation circuit 270 is dynamic and configured adaptively according to the operational mode 230.

The interpreting circuit 220 may also derive one or more operational parameters 250 and forward such information to the operation circuit 270. The operational parameters 250 may be used by the operation circuit in performing operations consistent with the operational mode 230. In addition, the interpreting circuit 220 may also derive data information 255 from the input signal and then forward such data to the operation circuit 270 which may subsequently forward such data information to the cores (110).

As mentioned above, the operation circuit 270 may be dynamically configured so that it performs operations consistent with the operational mode 230. The operation circuit 270 may be configured to interface with the coupled ICs (cores), including making appropriate connections to the ICs, sending information to the ICs, and receiving information from the ICs. The operation circuit 270 may also be configured to deliver information to the outside as the output 140 in an appropriate manner.

Figure 3:
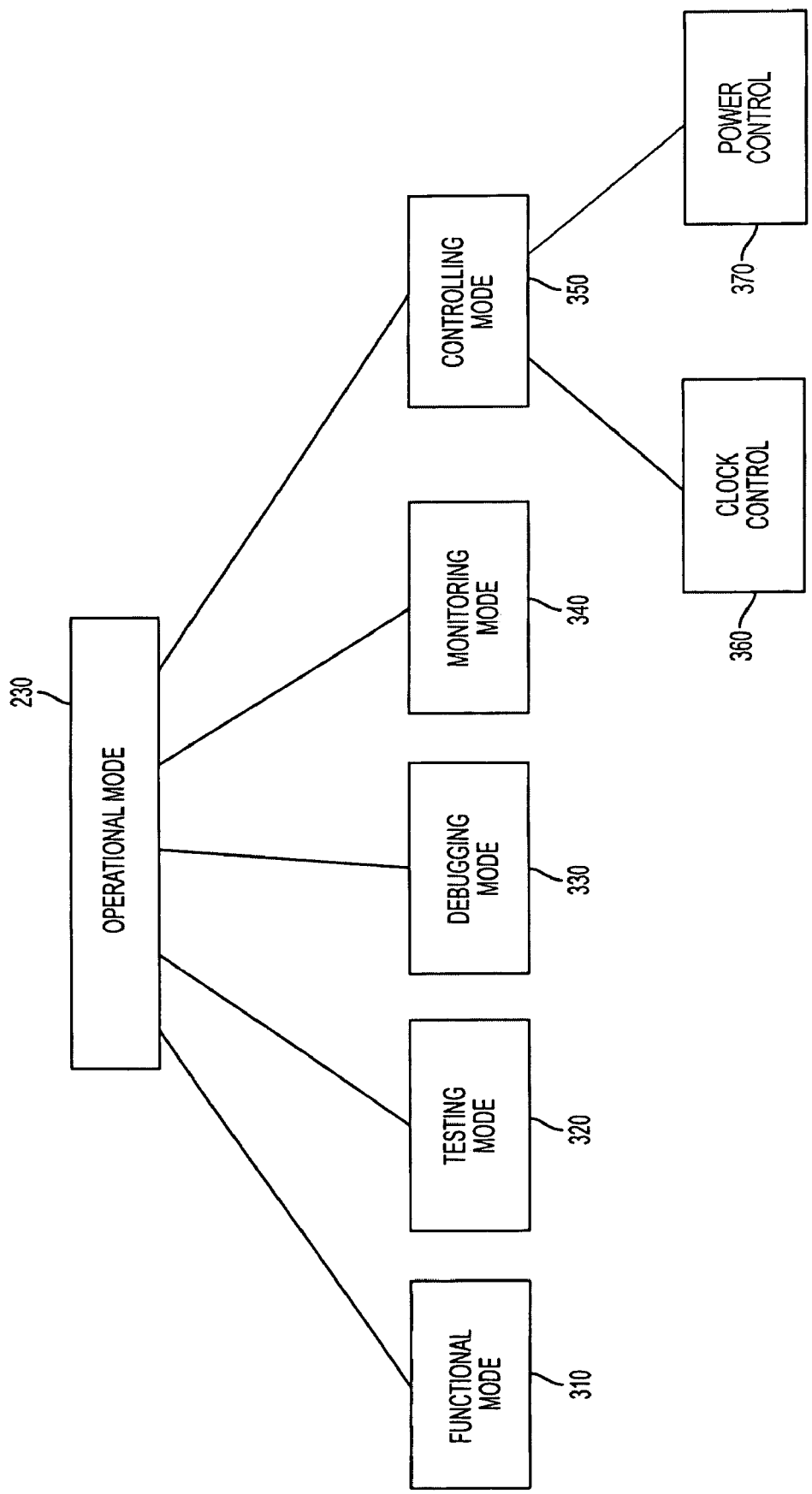
FIG. 3 describes exemplary types of operational modes according to some embodiment of the invention.

FIG. 3 describes exemplary types of operational modes according to an embodiment of the invention. In this example, the operational mode 230 may be one of a plurality of modes such as a functional mode 310, a testing mode 320, a debugging mode 330, a monitoring mode 340, and a controlling mode 350. The functional mode 310 may refer to an operational mode in which the CFC 150 is to be configured to facilitate the coupled ICs to perform the functions that they are designed to perform.

The testing mode 320 may refer to an operational mode in which the CFC 150 is to be configured to facilitate testing the coupled ICs. For example, the CFC 150 may be configured to recognize, from the input signal 160, information indicating the test mode and information associated with testing data. In the test mode 320, the CFC 150 may be reconfigured to derive, from the intercepted input signal 160, other control information related to the test and then direct different types of information to appropriate destinations. For example, some of the intercepted information such as control information may be forwarded to the re-configuring circuit 240 so that such information can be used to determine how the operation circuit 270 is to be reconfigured. In addition, test data may be forwarded directly to the coupled ICs or to the operation circuit 270 which may subsequently forward the test data to the coupled ICs after a certain operation (e.g., downward conversion) is applied.

The debugging mode 330 may refer to an operational mode in which the CFC 150 is configured to assist debugging the coupled ICs in their functional state. For example, the CFC 150 may be configured to set up break points within the coupled ICs or probe certain intermediate status of some internal variables of the coupled ICs. The monitoring mode 340 may refer to an operational mode in which the CFC 150 is configured to monitor the operations of the coupled ICs and may also be configured to produce, for example, information characterizing the operations. For instance, the CFC 150 may be configured to monitor the throughput of each coupled IC and to generate statistics describing the throughput of each IC (e.g., mean and standard deviation of the throughput of each IC).

The controlling mode 350 may refer to an operational mode in which the CFC 150 is configured to perform functions related to some control aspects relative to the coupled ICs. For example, the CFC 150 may be configured to provide clock control 360 by producing a clock signal of a certain rate to be used by the coupled ICs in performing their designated function(s). The CFC 150 may also be configured to provide power control 370. It should be noted that control of other aspects may also be applicable. In addition, such controlling mode may be selected or applied in conjunction with any of the other operational modes (not shown).

Figure 4A:
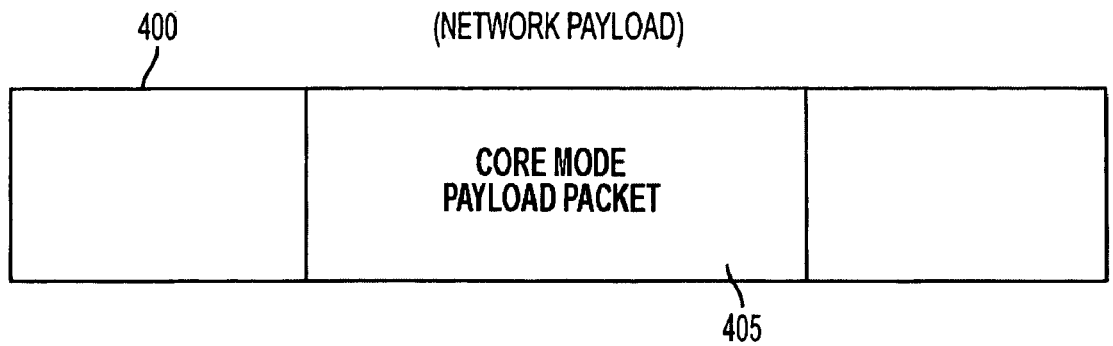
FIGS. 4(a)-4(d) illustrate exemplary constructs of an input signal in the form of a network payload packet having a core mode payload packet therein, according to an embodiment of the invention.

FIG. 4(a) illustrates an exemplary approach to deliver operational mode information by utilizing a data stream designated to be processed by an IC, according to an embodiment of the invention. Specifically, FIG. 4(a) shows that the input signal 160 is in the form of a network payload 400, which includes a core mode payload packet 405, carrying information to be used to instruct the CFC 150 in terms of one or more operational modes and corresponding operational parameters. For example, the core mode payload packet 405 may be incorporated to carry instructions associated with a functional mode, a test mode, a debug mode, a monitoring mode, a control mode, etc. The core mode payload packet 405 may also be used to instruct the CFC 150 to reconfigure to perform operations under concurrent several operational modes. For example, a functional mode may be combined with a monitoring mode. A test mode may be combined with a clock control mode. A functional mode may be combined with a power control mode.

Figure 4B:
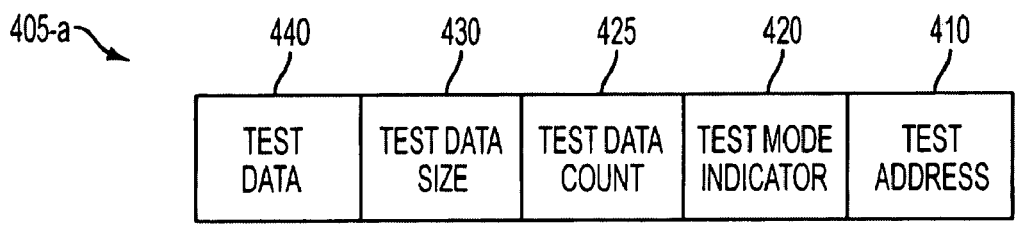
Figure 4C:
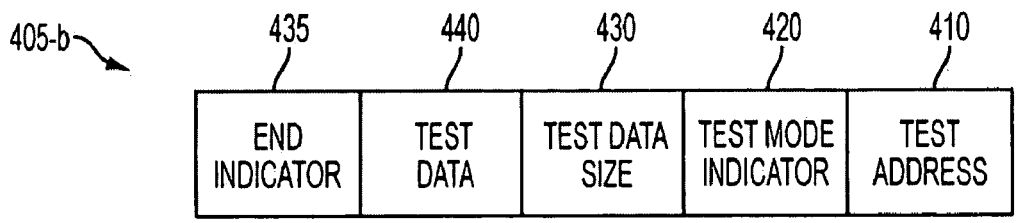
Figure 4D:
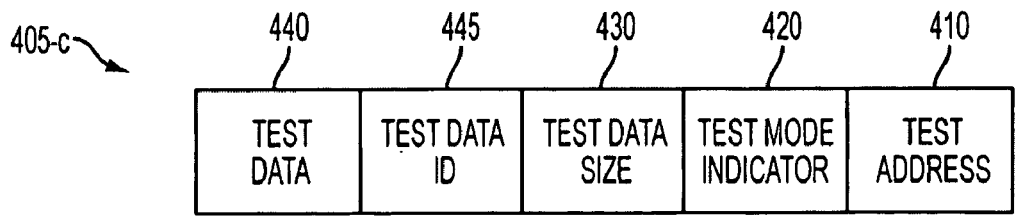

FIGS. 4(b)-4(d) illustrate exemplary constructs for the core mode payload packet 405 to carry information related to the test mode 320, according to different embodiments of the invention. In these exemplary constructs, the network payload 400 carries information necessary to carry out operations under the test mode (320) in the core mode payload packet 405. The construct 405-a in FIG. 4(b) comprises a test address field 410, a test mode indicator field 420, a test data count field 425, a test data size field 430, and a test data field 440. In this example, the test address field 410 may carry address information to be used to determine a destination core to be tested. The test mode indicator field 420 may provide flag information indicating a testing mode. The test data count field 425 may store a number representing a total number of test data to be applied during the testing. The test data size field 430 may provide information indicating the size of each piece of the testing data. The test data field 440 stores all the test data. Information stored in the test data count field 425 and the test data size field 430 may be used to determine how to parse the information stored in the test data field 440. That is, the test data count, as provided by the test data count field 425, multiplied by the test data size, as provided in the test data size field 430, may correspond to the total size of the test data field 440.

FIG. 4(c) shows a different exemplary construct 405-b of the core mode payload packet 405, according to an embodiment of the invention. Compared with the construct 405-a, the exemplary construct 405-b includes all the fields discussed above except the test data count field 425. Instead, an end indicator field 435 is provided, which signifies the end of the test data field 440. Therefore, instead of explicitly controlling to extract a given number of test data pieces according to a test data count, each piece of the test data in the test data field 440 may be identified based on test data size, as stored in the test data size field 430, until the end indicator in the end indicator field 435 is encountered. Therefore, using the exemplary construct 405-b, a flexible number of test data pieces may be delivered.

FIG. 4(d) shows another different exemplary construct 405-c of the core mode payload packet 405, according to an embodiment of the invention. In this exemplary construct, only one piece of test data, identifiable through a unique identification for the test data, is delivered in each core mode payload packet 405. So, in addition to the test address field 410, the test mode indicator field 420, the test data size field 430, and the test data field 440, the exemplary construct 405-c includes a test data ID field 445, which provides information to be used to uniquely identify a piece of data. The exemplary construct 405-c may be used when a data stream comprising a plurality of pieces of data items is delivered through a network to a destination and individual pieces of data items in the data stream may arrive at the destination out of order. With the test data ID in each packet, the data stream may be reassembled in an appropriate order at the destination despite their arriving order.

Figure 5:
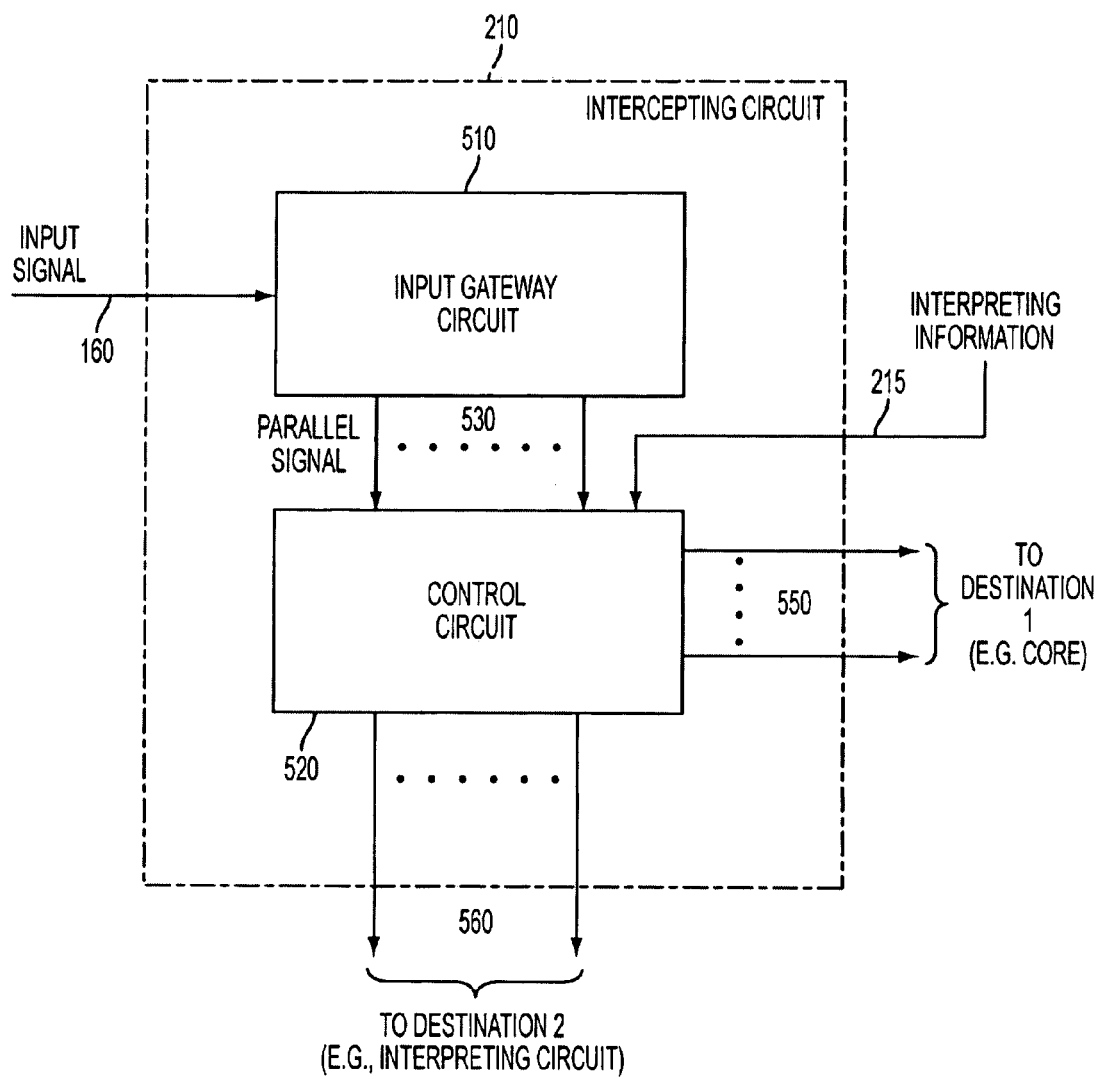
FIG. 5 depicts an exemplary internal structure of an intercepting circuit, according to an embodiment of the invention.

FIG. 5 depicts an exemplary internal structure of the intercepting circuit 210, according to an embodiment of the invention. In this exemplary embodiment, the intercepting circuit 210 comprises an input gateway circuit 510 and a control circuit 520. The input gateway circuit 510 may function to intercept the input signal 160 and then convert the intercepted signal into a form that is operable within the CFC 150 (for information to be forwarded to the CFC 150) or within the coupled cores (for information to be forwarded to a core). For example, circuits in the CFC 150 other than the input gateway circuit 510 may require data of a certain format different from the input signal format. In addition, a destination to where information from the input signal is to be sent (e.g., the CFC 150 or a coupled core) may operate at a different speed than the input signal 160 so that information intercepted from the input signal 160 may need to be converted to a destination speed.

Figure 6:
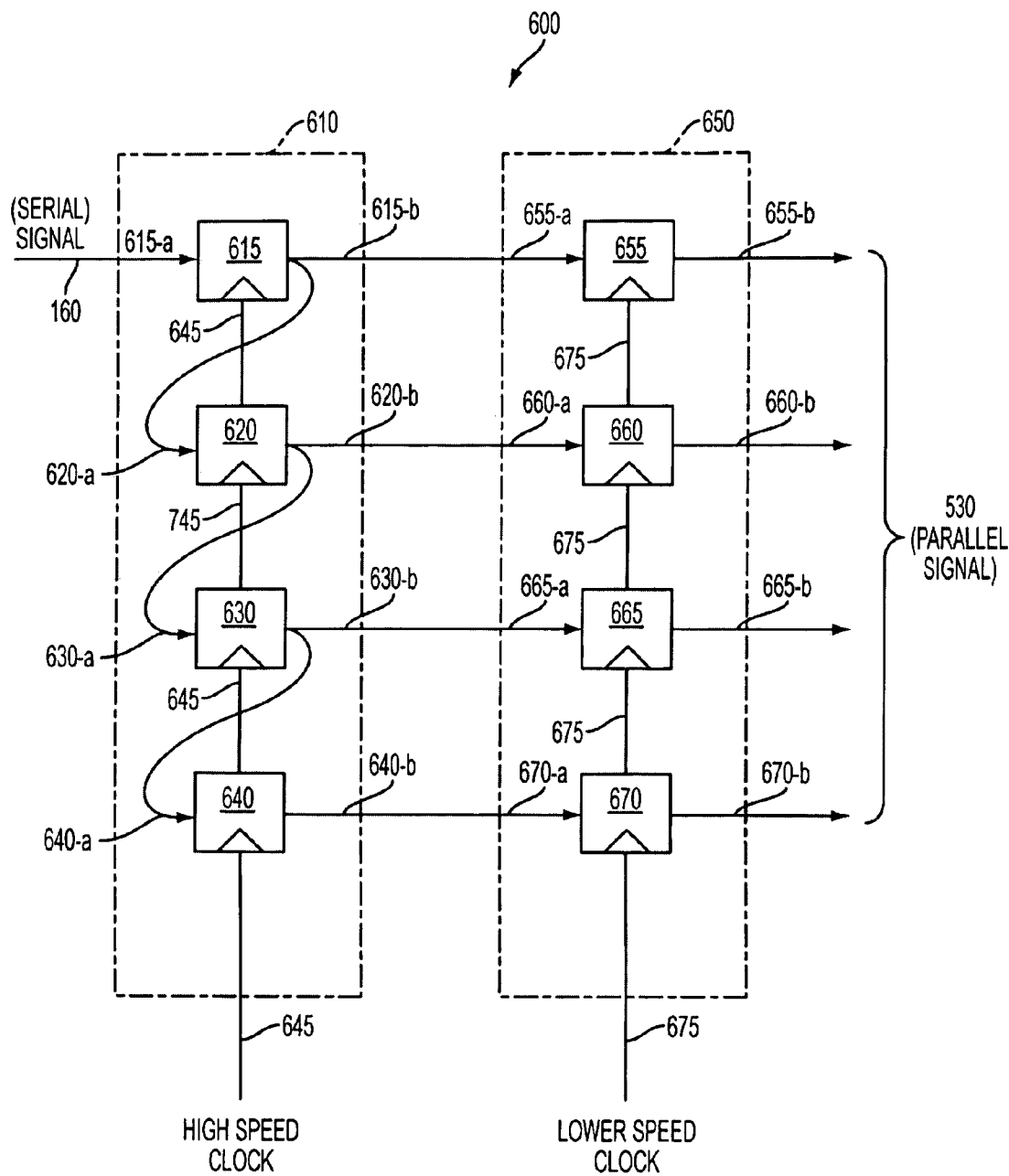
FIG. 6 depicts an exemplary implementation of at least part of an input gateway circuit with the capability of converting an input signal at a higher speed to data at a lower speed, according to an embodiment of the invention.

FIG. 6 depicts an exemplary implementation 600 of at least part of the input gateway circuit 510 with the capability of converting an input signal at a higher speed to data at a lower speed, according to an embodiment of the invention. The exemplary implementation 600 includes two banks of configurable shifting registers, 610 and 620, respectively. Each bank of registers is controlled by a clock signal. A clock signal 645 is for controlling the register bank 610 and a clock signal 675 is for controlling the register bank 650. The clock signal 645 and the clock signal 675 may have different clock rates. In this illustrative embodiment, the clock signal 645 has a higher speed and the clock signal 675 has a lower speed.

The implementation 600 shows a conversion of 4:1. That is, the higher speed clock is four times faster than the lower speed clock. Each shifting register bank comprises four registers. The register bank 610 includes registers 615, 620, 630, and 640, connected in a serial manner. The input signal 160 is intercepted by the first register 615 at a rate controlled by the clock signal 645. The output pin of the register 615, labeled as 625-b, is connected with the input pin 620-a of the register 620. Similarly, the output pin 620-b of the register 620 is connected to the input pin 630-a of the register 630, and the output pin 630-b of the register 630 and the input pin 640-a of the register 640 is connected with the output pin 630-b of the register 630. At each clock cycle, one bit is shifted from the output of a previous register to the input pin of a next register along the register chain 615-620-630-640. After four clock cycles, all four output pins of the register bank 610 are occupied by information bits from the input signal 160.

The four output pins 615-b, 620-b, 630-b, and 640-b of registers 615, 620, 630, and 640 are also connected, in parallel, to the input pin 655-a of register 655, 660-a of register 660, 665-a of register 665, and 670-a of register 670 of the register bank 650. Since the clock signal 675 is 4 times slower than the clock signal 645, when the clock signal 675 is enabled, the four registers in the register bank 650 outputs the 4 bit information in parallel on the output pins 655-b, 660-b, 665-b, and 670-b. These information bits output in parallel have a slower clock rate, which may be determined consistent with a destination to where the control circuit 520 forwards the converted information 530.

The converted information 530 produced by the input gateway circuit 520 may then be forwarded to the control circuit 520 that controls directing such information to appropriate destinations. For example, the information 530 may be directed to a destination 550 representing a coupled core or to another destination 560 representing a route to the interpreting circuit 220. The control circuit 520 may make a determination as to the destination based on a signal 215 received from the interpreting circuit 220. For example, when a signal constructed in accordance with the exemplary construct 405-a is intercepted, the intercepted information may be forwarded to the interpreting circuit 220 first by default. When the interpreting circuit 220 recognizes the test address and determines that it matches one of the addresses associated with the coupled cores, it may send the control circuit 520 a signal 215 to continue directing information to the interpreting circuit 220 so that other control information such as a test mode indicator, a test data count, and a test data size may be recognized and extracted.

When the interpreting circuit 220 recognizes a test data size (which is followed by test data), it may send a control signal 215 to the control circuit 520 to instruct directing all future data received from the input gateway circuit 510 to the core having an address that matches the recognized test address. Upon receiving such a signal 215, the control circuit 520 then directs all future data 550 to a specified core.

Figure 7:
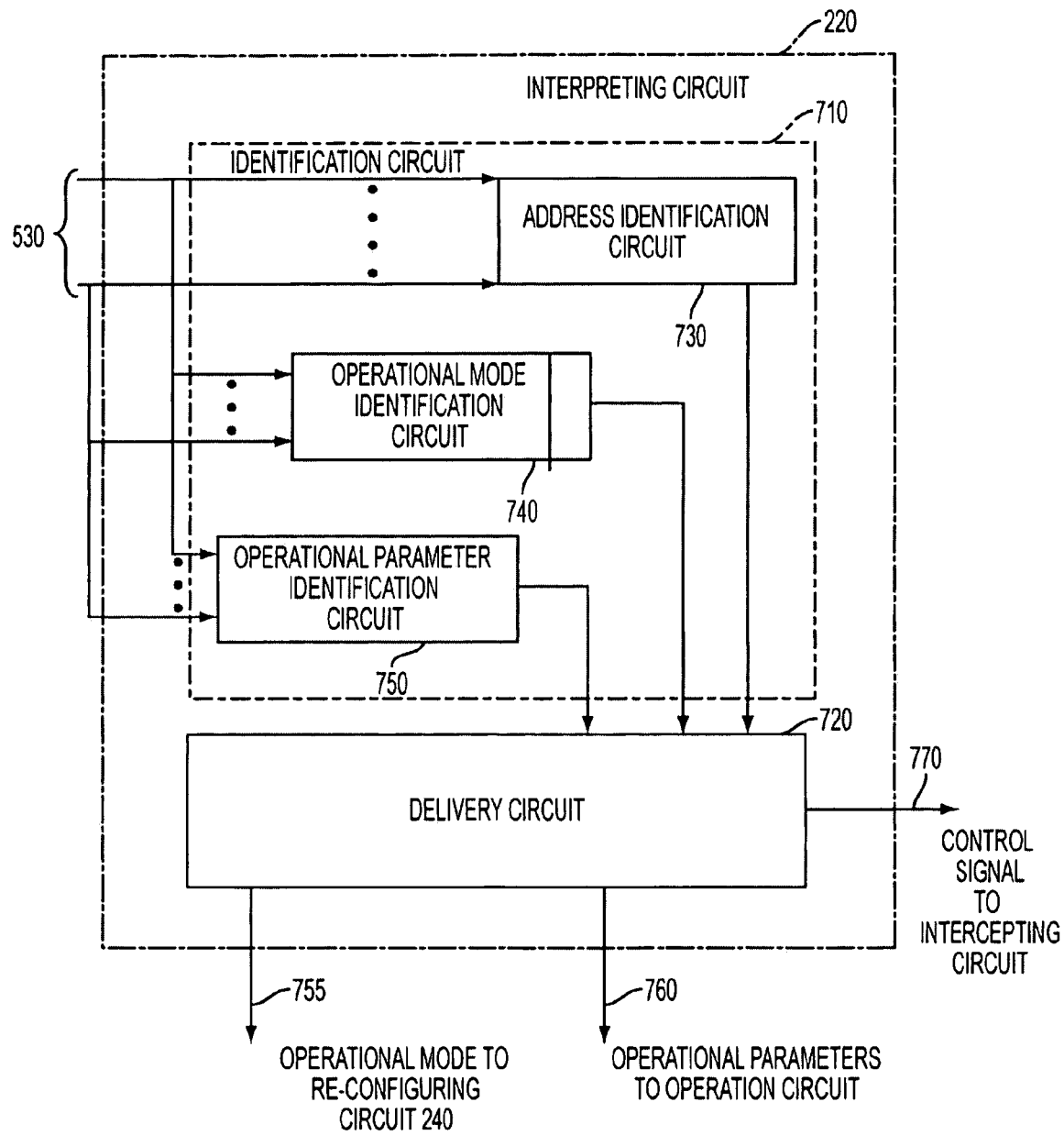
FIG. 7 depicts an exemplary internal structure of an interpreting circuit, according to an embodiment of the invention.

FIG. 7 depicts an exemplary internal structure of the interpreting circuit 220, according to an embodiment of the invention. The exemplary interpreting circuit 220 comprises an identification circuit 710 and a delivery circuit 720. The identification circuit 710 may be configured to identify specific information such as a particular address or a particular control information such as a test data count. The delivery circuit 720 may be configured to direct different types of information recognized by the identification circuit 710 to different destinations. For example, the delivery circuit 720 may forward an identified operational mode 755 to the re-configuring circuit 240 (FIG. 2) so that the re-configuring circuit 240 can reconfigure the operation circuit 270 according to the operational mode. The delivery circuit 720 may be configured to direct recognized operational parameters to the reconfigured operation circuit 270 so that the operation circuit 270 can perform operations in connection with the detected operational mode based on the operational parameters.

The delivery circuit 720 may also be configured to send certain control signals to different destinations. For example, when the exemplary core mode payload packet 405-a is interpreted, identification of the test data size 430 by the identification circuit 710 may trigger the delivery circuit 720 to send a control signal 770 to instruct the control circuit 520 of the intercepting circuit (FIG. 5) to direct test data that follows to the core being tested.

Depending on the information that needs to be identified, the identification circuit 710 may be configured differently. In the given example, the identification circuit 710 comprises an address identification circuit 730, an operational mode identification circuit 740, and an operational parameter identification circuit 750. Input to these identification circuits are forwarded from the control circuit 520 of the intercepting circuit 510. In one embodiment, the identification circuits 730, 740, and 750 may operate at a speed different from the speed of the input signal 160. In this case, the input to the identification circuits corresponds to a converted signal 530 from the input gateway circuit 510. In a different embodiment, the identification circuits 730, 740, and 750 may operate at the same speed so that the input to these circuits may directly come from the input signal 160 (not shown).

The address identification circuit may be configured to recognize address information intended to be used to uniquely address a core coupled with the CFC 150. The operational mode identification circuit 740 may be configured to recognize different operational modes such as those that are shown in FIG. 3. The operational parameter identification circuit 750 may be configured accordingly to extract information embedded in the input signal 160 that corresponds to parameters needed in carrying out operations under the detected operational mode. For example, when the detected operational mode is a testing mode (320), various operational parameters such as test data count (425), test data size (430), end indicator (435), and test data ID (445) may be present in the input signal 160 and may be extracted by the operational parameter identification circuit 750.

Figure 8:
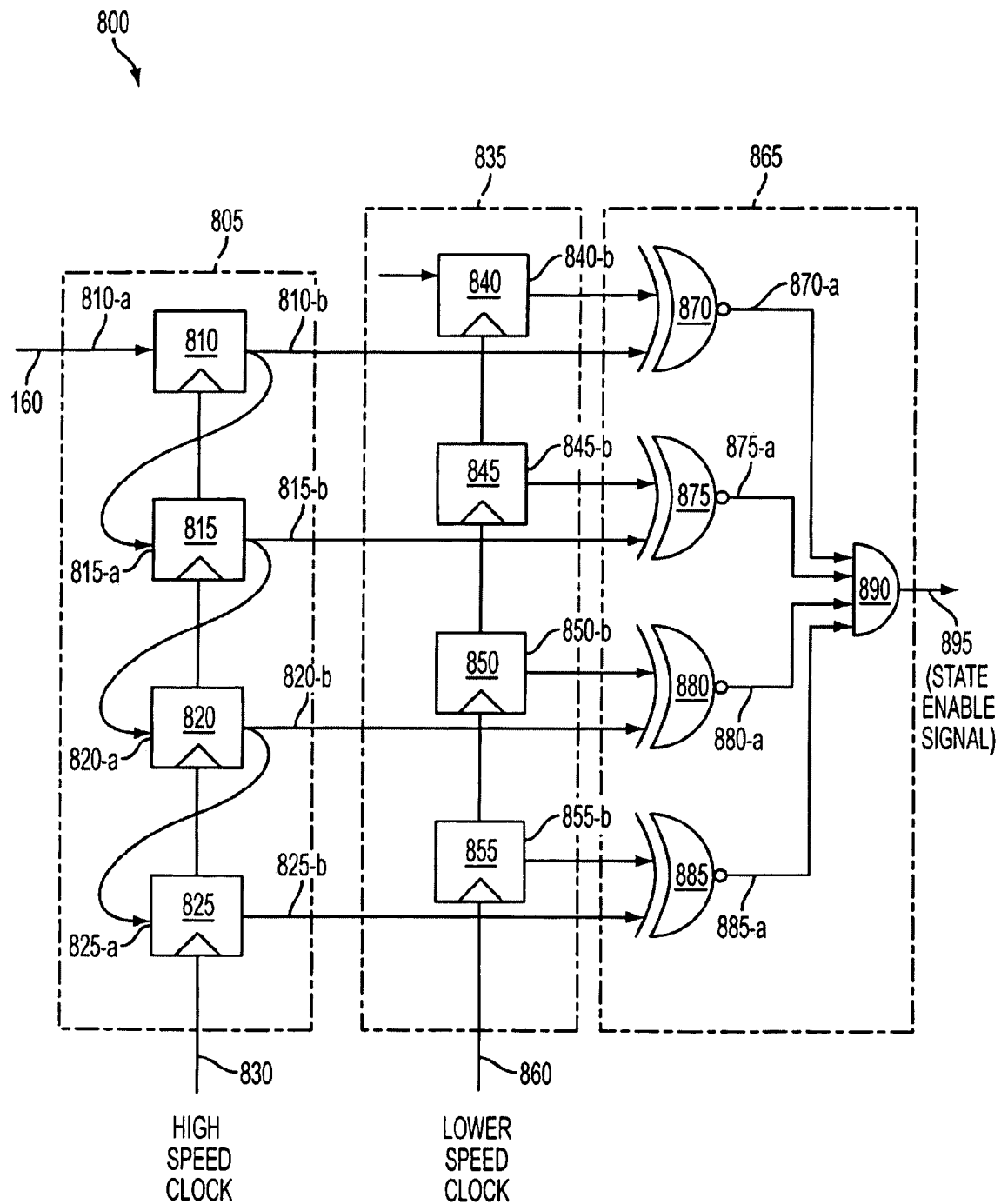
FIG. 8 depicts an exemplary implementation of an identification circuit, according to an embodiment of the invention.

FIG. 8 depicts an exemplary implementation 800 of an identification circuit, according to an embodiment of the invention. The exemplary implementation circuit 800 comprises two banks of registers, 805 and 835, and a comparator 865. The first bank 805 may supply one set of information bits to be compared to the comparator 865. The second bank 835 may supply another set of information bits to be compared to the comparator 865. In this example, the first set of information bits are from the input signal 160. Depending on the information to be extracted from the input signal, the other set of information bits from the second bank 835 may correspond to the information to be identified from the input signal 160. For example, if information to be detected from the input signal 160 is an address associated with a core coupled with the CFC 150, the information bits from the second bank 835 correspond to the address, which may be pre-stored in the second bank 835 or retrieved from elsewhere. The comparator 865 may produce an output 895 signifying a match when the information bits from the first bank 805 match the information bits from the second bank 835.

The first bank of registers 805 includes a plurality of shifting registers, 810, 815, 820, and 825, that are connected in a serial fashion similar to the bank of registers 610 in FIG. 6. The output pin 810-b of the register 810 is connected to the input pin 815-a of the register 815, the output pin 815-b of the register 815 is connected to the input pin 820-a of the register 820, the output pin 820-b of the register 820 is connected to the input pin 825-a of the register 825. These shifting registers are controlled by a clock signal 830. At each cycle of the clock signal, the output pin of each register shifts a bit to the input pin of the connected register. At the end of 4 clock cycles, a bit travels from the input pin 810-a of the register 810 to the input pin 825-a of the register 825. Although only four registers are shown in this exemplary embodiment, the number may be adjusted according to application needs.

In this illustration, the first bank 805 operates at a speed higher than the speed at which the second bank operates. That is, input to this illustrated identification circuit may directly come from the input signal 160. Although four registers are illustrated in the bank 805, the number of registers used in practice may depend on the rate of conversion from a higher speed to a lower speed. In addition, since the first bank operates at the input signal speed, there is no need to down convert the input signal 160 prior to performing information identification (e.g., convert using the input gateway 510 shown in FIG. 5). On the other hand, the bank 805 may be viewed as part of the input gateway 510 configured to down convert the input signal 160 before forwarding to the comparator 865.

The second bank 835 comprises a plurality of registers 840, 845, 850, and 855. Each register in the second bank 835 may store a bit of the information to be identified. All the registers in the second bank are controlled by a clock signal 860, which may have a slower speed than the clock signal 830. In the illustrated embodiment, the clock signal 860 operates at a speed that is one fourth of the clock signal 830. At an activation of the clock signal 860, each register in the second bank sends their bits in parallel to the comparator 865. Depending on the information to be identified, such information may be pre-stored in the registers of the second bank. The number of registers used in the second bank may also be determined based on the information to be identified. For example, in the illustrated embodiment, four bits of information are pre-stored in the second bank.

The output bits from individual registers in the first bank 805 are forwarded to the comparator 865 at separate clock cycles of the higher speed clock signal 830. At the first clock cycle, the first bit at the output pin 810-b is forwarded to the comparator 865 (also to the input pin 815-a). At the second clock cycle, both the first and the second bits at output pins 810-b and 815-b are forwarded to the comparator 865, etc. At the end of the fourth clock cycle, all four bits from the input signal 160 are forwarded to the comparator 865. At the same time, the lower clock signal 860 is also activated triggering all four bits stored in the registers 840, 845, 850, and 855 to be forwarded to the comparator 865 via their output pins 840-b, 845-b, 850-b, and 855-b. It should be appreciated by any person skilled in the art that such comparison is not limited to four (4) bits. In addition, a comparison may be made among more than two sets of data.

In the exemplary implementation 800, the comparator 865 comprises four gates 870, 875, 880, and 885, each of which has two inputs, and one fifth gate 890. For each of the four gates, there are two inputs, one of which is from a corresponding register from the first bank 805 and the other is from a corresponding register from the second bank 835. When the two bits to a single gate have equal bit values, the output of the gate has an output of one. Otherwise, the gate has an output value of zero. The outputs of the four gates (i.e., 870-a, 875-a, 880-a, and 885-a) are forwarded to the fifth gate 890, which functions as an AND gate having a zero output at 895 when any one of its inputs (or outputs of any of the four gates) has a value of zero and having a one output at 895 when all of its inputs have a value of one. That is, when there is a match between the input signal 160 and pre-stored information from 835, the output of the comparator 865 is high. When there is no match, the output of the comparator 865 is low.

When multiple pieces of information need to be identified, each piece of information may be recognized using a similar circuitry with appropriate modifications to fit application needs. Each of such identification circuits may output a state enabling signal (similar to signal 895) and individual enabling signals from different comparators may be combined. For example, they may be ORed if the goal is to recognize any one piece of information. They may also be ANDed so that the output of the AND gate indicates when all pieces of information are recognized.

FIG. 9(a) shows a state machine 920 capable of recognizing different types of information detected in a sequence, according to an embodiment of the invention. In this illustration, there are four states in the state machine 920: a "Poll" state 930, an "Address" state 940, a "Test mode" state 950, and an "End" state 960. Any state may remain in the same state. This is shown as the self-looping arrow in FIG. 9(a). Upon being triggered by a certain event, a state may transit to a different state. For example, the "Poll" state 930 may transit to the "Address" state 940 upon being triggered by the event 935 of finding a matching address. Similarly, the "Address" state 940 may transit to the "Test mode" state 950 when an event 945 of a test mode is detected. That is, the state machine 920 may be in the "Test mode" state 950 only after a test mode is detected or identified after an address match is found. In addition, some transitions among different states may be one directional. For example, from the "Address" state 940 to the "Test mode" state 950 is one directional. So, each state of the state machine 920 may signify a certain sequence of information identified from the input signal 160. For example, if the state machine 920 is at state 950, it indicates that both an address and a test mode have been found and the test mode is detected after the identified address.

It is commonly known that each state in a state machine may produce an output signifying the current state of the state machine. In the exemplary state machine 920, when the state machine 920 transits from the "Address" state 940 to the "Test mode" state 950, it outputs a signal 955 or a test enable signal. Such output signal may be used to trigger certain operations to be performed in the CFC 150. For example, when the state machine 920 outputs a test enable signal 955, it indicates that both a matching address has been found and the operational mode corresponds to a test mode. Such a signal may be used to initiate operations associated with testing a core that has the identified address. It is also noted that the states of the state machine 920 may also cycle with respect to repeating events (not shown). For example, upon a certain event, the last state (e.g., the "End" state) in one cycle may transit back to the first state in the cycle (e.g., the "Poll" state).

FIG. 9(b) illustrates an exemplary state table 970 for the state machine 920, according to an embodiment of the present invention. The four states may be coded using two binary state variables $Q_A$ and $Q_B$. The left column in the exemplary state table 970 corresponds to codes of the states. The right column of the state table 970 corresponds to a description of the states. For example, the two binary state variables have four combinations: 00, 10, 01, and 11, as illustrated in the left column of the state table 970, and they correspond to the four states described earlier. For example, code "00" may correspond to the "Poll" state 930, code "10" may correspond to the "Address" state 940, code "01" may correspond to the "Test mode" state 950, and code "11" may correspond to the "End" state 960.

FIG. 9(c) illustrates an exemplary implementation 900 of the state machine 920 consistent with the state table 970, according to an embodiment of the invention. The outputs of two registers 905 and 910 may be used to represent the two binary state variables $Q_A$ and $Q_B$. Both registers are controlled by a common clock signal 915. The outputs 905-a and 905-b of the register 905 are feedback to its input, respectively. Similarly, the outputs 910-a and 910-b of the register 910 are feedback to its input, respectively. In addition, one output 905-b of register 905 is connected to the register 910 as a triggering signal. With each state enable signal, the state expressed via the two binary state variables $Q_A$ and $Q_B$ advances according to the state table 970. In addition, based on the values of $Q_A$ and $Q_B$, additional circuitry may be constructed to generate different outputs associated with each different states. For instance, in the exemplary state machine 920, the "Test mode" state 950, once it is reached, produces a signal "Test Enable" 955. This may be implemented using an AND gate 917 as shown in FIG. 9(c). As shown, one of the inputs to the AND gate 917 is connected to the output pin 905-b of register $Q_A$ and the other is to the output 910-a of register $Q_B$. When $Q_A$=0 and $Q_B$=1, corresponding to the configuration for the test mode 950, the output of the AND gate 917 is high to yield the test enable signal 955. When other states have state output, similar circuitries may be correspondingly created.

There is a state enabling signal 895 from the comparator 865 connected to an input terminal of the register 905. Whenever the comparator 865 detects a match, the output of the comparator 865, or the state enabling signal 895, is activated and is sent to the register 905 as an input. Upon the activation of the clock signal 915, the register 905 flips its output 905-b. If the initial state of $Q_A$ or 905-b is zero, upon receiving the state enabling signal 895, the output of register 905 or $Q_A$ is changed to one (1). This changed output $Q_A$ is forwarded to an input of the register 910 so that at the next clock cycle, the state of $Q_B$ is also changed. If the initial state of $Q_B$ is zero, it is changed to one (1). If there are multiple pieces of information to be identified (e.g., test address and test mode), the state enabling signal 895 may correspond to ORed or ANDed state enabling signals (as discussed above). In this case, the state represented by a combination of variables $Q_A$ and $Q_B$ may cycle to different states as shown in the state table 970. In this exemplary implementation, the states cycle according to the state table 970 and the state "11" (or the "End" state) transits to the state "00" (or the "Poll" state) upon a next state enable signal 895 (not shown in FIG. 9(a)).

Figure 10:
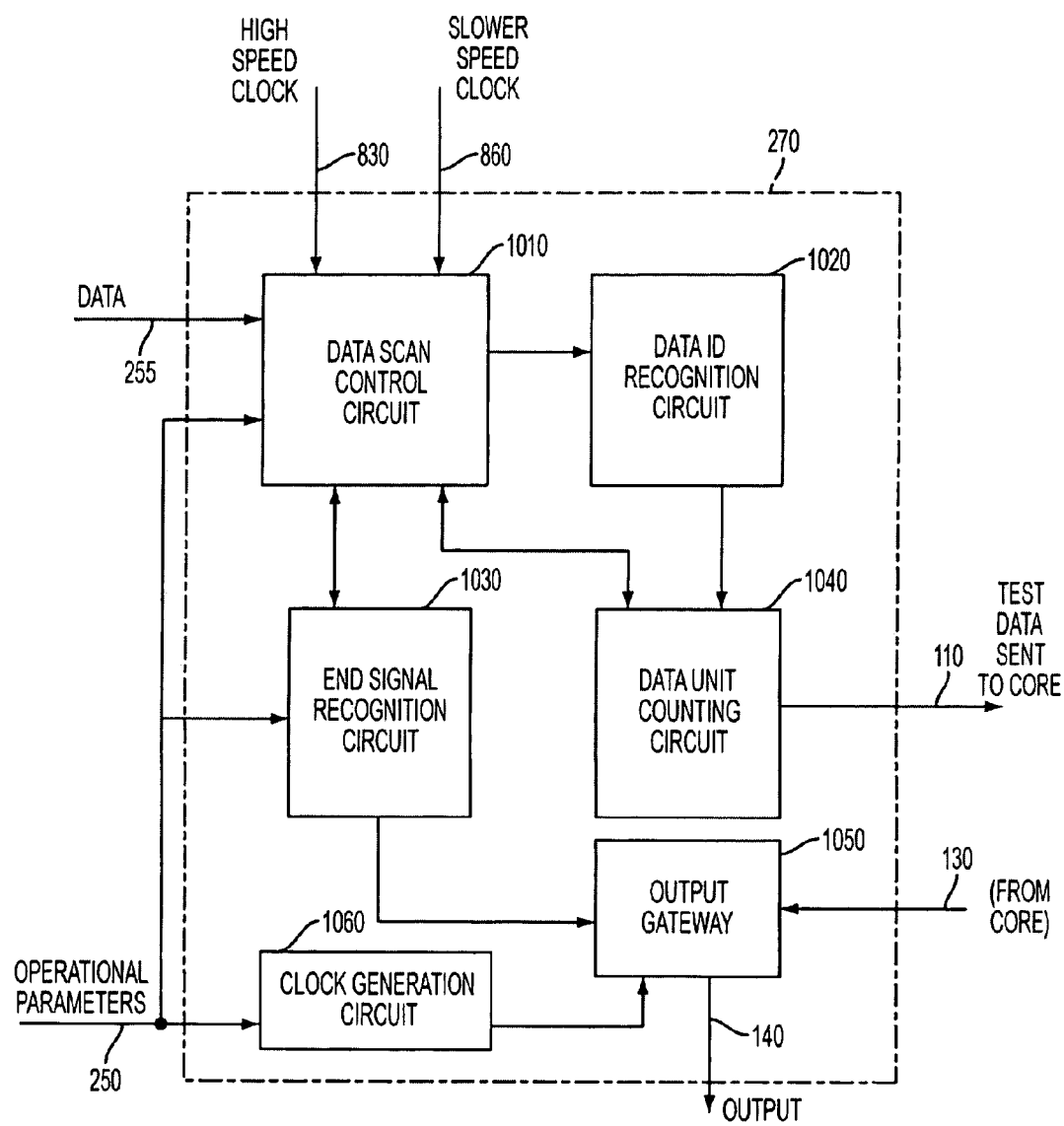
FIG. 10 depicts an exemplary internal structure of an operation circuit, according to an embodiment of the invention.

FIG. 10 depicts an exemplary internal structure of the operation circuit 270, according to an embodiment of the invention. As discussed above, the operation circuit 270 is reconfigured based on a received operational mode. That is, both the construct and the function of the operation circuit 270 changes depending on the operational mode. For example, the operation circuit under a functional mode may differ from that under a test mode. Similarly, the operation circuit under a test mode may be different from that under a debugging mode. The exemplary internal structure of the operation circuit 270 is formed under a test mode and it is reconfigured to facilitate testing a coupled core.

In this exemplary construct, the operation circuit 270 comprises a data scan control circuit 1010, that parses testing data received from the interpreting circuit 220 (FIG. 2), a data unit counting circuit 1040, that counts an expecting number of testing data unit(s), a clock generation circuit 1060, and an output gateway 1050. Optionally, the operation circuit 270 may also include a data ID recognition circuit 1020, an end signal recognition circuit 1030, or a data unit counting circuit 1040. These optional circuits may be configured when the core mode payload packet is structured according to embodiment 405-b or 405-c (FIGS. 4(c)-(d)).

As shown in FIG. 2, operational parameters are forwarded to the operation circuit 270. Each of the circuits within the operation circuit 270 may function in accordance with the operational parameters. For example, some of the operational parameters may be used for data scan control (e.g., parsing test data by data size by 1010), some for recognizing a data pattern ID (e.g., matching an ID provided as test data ID in 405-c with an ID in the test data by 1020), some for recognizing an end signal (e.g., matching received data with an end indicator provided in 405-b by 1030), some for controlling a total number of test data patterns received (e.g., by 1040), some for generating appropriate clock signals (by 1060).

When test data 255 is received, the data scan control circuit 1010 parses the received data and directs it to appropriate circuit(s) for further processing. It may direct the received data to the data ID recognition circuit 1020 when the underlying core mode payload packet is structured according to 405-c. In this case, unless the given test data ID 445 is found in the received test data, no test data without a matching test data ID may be forwarded from the operation circuit to a designated core. The data scan control circuit 1010 may also parse a test data according to a given test data size (430) and then forward the parsed data to the data unit counting circuit 1040. The data unit counting circuit 1040 may forward the parsed data, once counted, to a designated core subject to the control of the data ID recognition circuit 1020, which may send a control signal to the data unit counting circuit 1040 to stop a forwarding operation when a received test data does not have a matching test data ID.

The data scan control circuit 1010 may also forward received data to the end signal recognition circuit 1030 to see whether an end signal has been received. For example, when the core mode payload packet is organized according to 405-*b*, receipt of an end signal triggers the operation circuit 270 to trigger the output gateway 1050 to poll a test result from a designated core. The clock generation circuit 1060 may be activated by different operational parameters such as parameters that describe the speed(s) at which different parts of the CFC 150 operate. For example, different portions of the CFC 150 may operate at different speeds, as shown in FIGS. 6 and 8. In this case, the clock generation circuit 1060 may generate required clock signals according to operational parameters and such generated clock signals are sent to appropriate portions of the CFC 150 as needed (not shown). For example, once the output gateway 1050 is activated, it may poll a test result from a core tested at a speed of the core and then convert the test result to form a signal at a different speed. This requires two different clock signals and they can be generated by the clock generation circuit 1060. Similarly, the data scan control circuit 1010 may also operate at two different speeds. For instance, it may receive test data at a higher speed 830 (e.g., serial data) and forward the received data to other parts of the CFC 150, which may operate at a lower speed (860). The clock generation circuit 1060 may also be designed to produce more than two different clock signals. In addition, it may also be configured to produce any required signals at an arbitrary clock rate.

Figure 11:
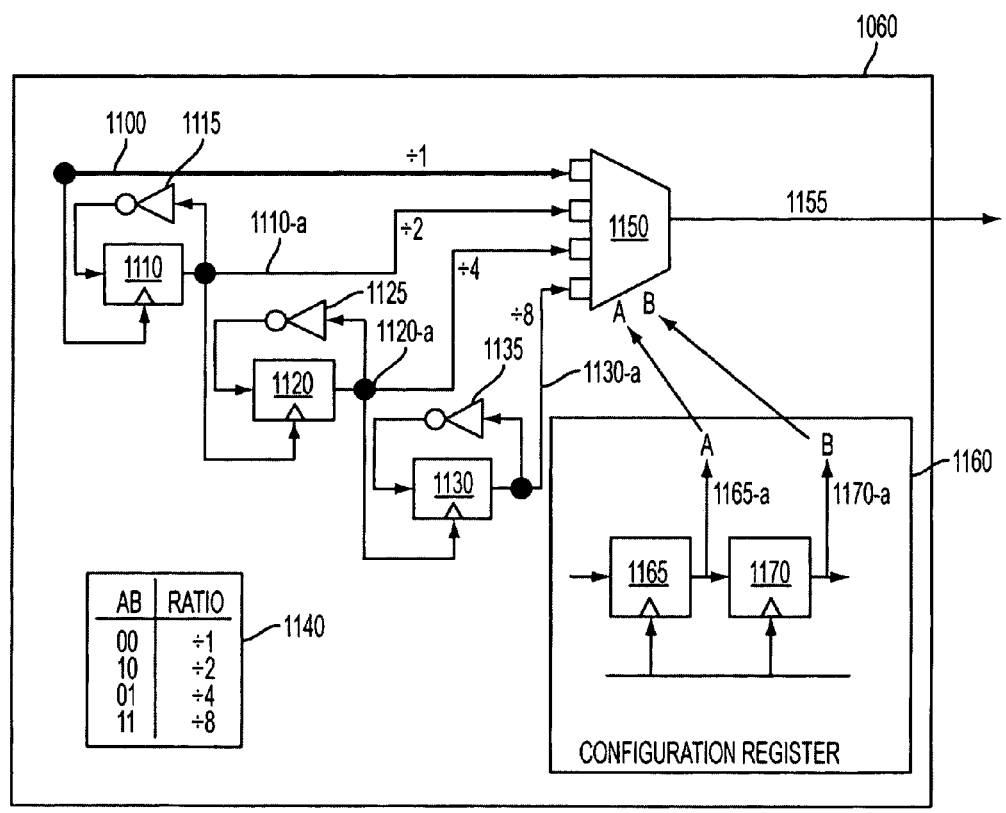
FIG. 11 depicts an exemplary internal structure of a clock generation circuit in a CFC, according to an embodiment of the invention.

FIG. 11 depicts an exemplary internal structure of the clock generation circuit 1060, according to an embodiment of the invention. In this illustration, the clock generation circuit 1060 is configured to generate clock signals at four different rates, a first rate, a second rate that is half of the first clock rate, a third rate that is one fourth of the first rate, and a fourth rate that is one eighth of the first clock rate. In this illustration, the clock generation circuit 1060 comprises gates 1110, 1120, and 1130, each of which down converts a signal by half of the original speed. For example, the gate 1110 takes signal 1100 at an original speed as input and outputs a signal (÷2) 1110-*a* that has a rate half of the original rate 1100. Similarly, the gate 1120 takes the output 1110-*a* of the gate 1110 as its input and produces an output 1120-*a* with a rate half of the rate of 1110-*a* or one fourth (÷4) of the original rate 1100. The gate 1130 takes the output 1120-*a* of the gate 1120 as its input and produces an output 1130-*a*, which is again half of the rate of 1120-*a* or one eighth (÷8) of the original rate 1100.

The clock signals 1100, 1110-*a*, 1120-*a*, and 1130-*a* of different rates are forwarded to a clock signal output gate 1150 that may select any one of the four clock signals as its output 1155. Such selection may be realized by configuring two registers 1165 and 1170 to form a state transition circuit as shown in 1160 of FIG. 11. There are a total of four states represented by the outputs 1165-*a* and 1170-*a* of the state transition circuit 1160. The state table of this state transition circuit is shown in 1140, where the outputs 1165*a* and 1170-*a* are coded as AB and each state corresponds to a combination of AB and there is a total of four different states corresponding to AB=00, AB=10, AB=01, and AB=11. These different states may be utilized to select a clock signal. For example, the outputs 1165-*a* and 1170-*a* may be connected to the clock signal output gate 1150. For each unique combination, the clock signal output gate 1150 is configure to select one of the four input signals so that one of them is output as an output clock signal 1155.

Figure 12:
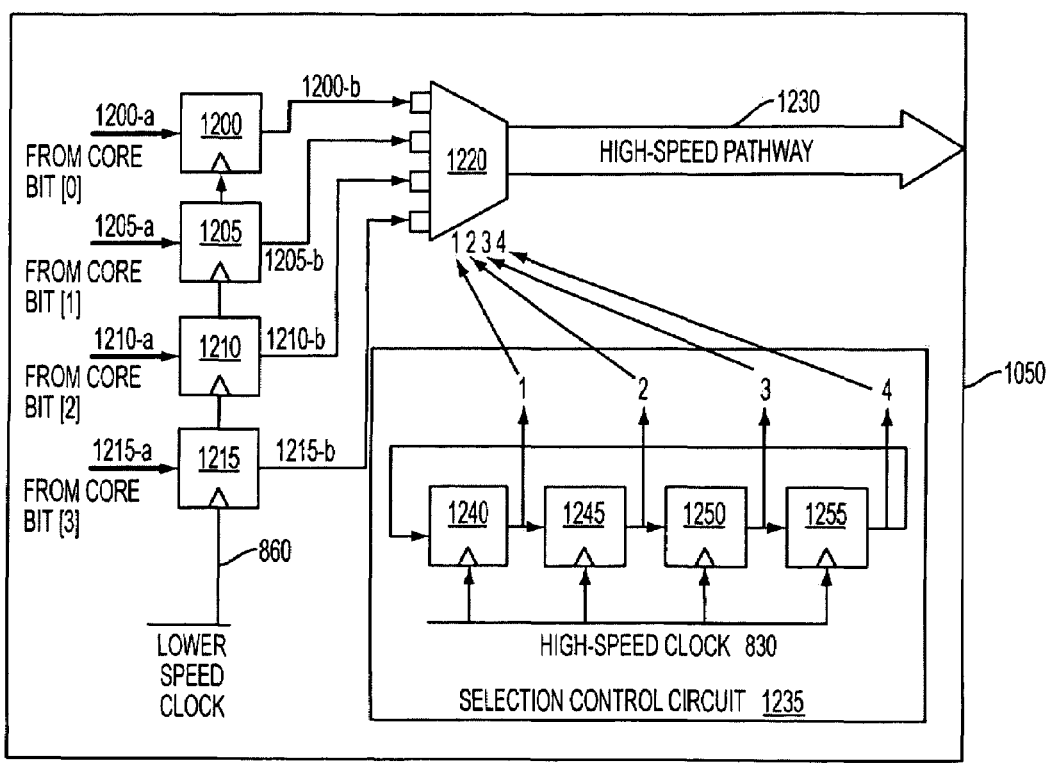
FIG. 12 depicts an exemplary internal structure of an output gateway, according to an embodiment of the invention.

FIG. 12 depicts an exemplary internal structure of the output gateway 1050, according to an embodiment of the invention. In this exemplary implementation, the output gateway 1050 polls data from a core (as shown in FIG. 11) and then forwards such data outside of the CFC 150. In some embodiments, the speed at which the core operates differs from the speed at which the data is to be forwarded. For example, the core from which the output gateway 1050 polls data may operate at a speed that is one fourth of the speed of a circuit to which the data is forwarded. The exemplary implementation shown in FIG. 12 describes an implementation of the output gateway 1050 that converts data from a core at a lower speed to output data at a speed four times faster than the lower speed. In FIG. 12, four bits of data from a core, 1200-*a*, 1205-*a*, 1210-*a*, and 1215-*a*, are forwarded to the input pin of four registers 1200, 1205, 1210, and 1215, respectively. When a lower speed clock 860 triggers, these four bits of information are forwarded to an output selector 1220 via the output pins 1200-*b*, 1205-*b*, 1210-*b*, and 1215-*b* of the four registers.

The output selector 1220 is connected to a high speed pathway 1230 that may transport information bits in a serial fashion at a speed four time as fast as the lower speed. A selection control circuit 1235 may be provided to generate control signals for controlling the output selector 1220 to select one bit at a time at each clock cycle running at the speed required by the high speed pathway 1230. In this exemplary embodiment, the selection control circuit 1235 comprises four registers, 1240, 1245, 1250, and 1255, connected in a sequence, each of which has its output connected to the input of a next register and the last register 1255 has its output wrapped around to connect to the input of the first register 1240. All registers in the selection control circuit 1235 are controlled by a high speed clock 830. At each high speed clock cycle, the output bit of a register is shifted to the next one as shown in FIG. 12 and, hence, the overall configuration of the four output bits of registers 1240, 1245, 1250, and 1255 changes. Since the four registers 1240, 1245, 1250, and 1255 form a ring, the configuration of the four-bit output of the selection control circuit 1235 repeats every four high speed clock cycles.

Each of the four configurations of the selection control circuit 1235 may be used to select one of the four output bits from the core at each high speed cycle. In this way, at each high speed clock cycle, one bit of information from the core is selected and different bits are output in a sequence to form a serial signal.

The output gateway may be controlled by various signals received from different circuits within the CFC 150. For example, when the operational mode derived from the input signal 160 is a testing mode, depending on the structure of the core mode payload packet, the operation circuit 270 may be reconfigured differently. For instance, if a core mode payload packet is constructed according to the exemplary embodiment 405-*b* (FIG. 4), the packet includes the test data 440 until an end indication signal 435 is encountered. Therefore, the operation circuit 270 is reconfigured to include the end signal recognition circuit 1030 to detect the end indication signal 435. In this case, when the end signal recognition circuit 1030 detects an end indication signal, it may send out a control signal to the output gateway 1050 to trigger the operation of polling a test result from a coupled core that is being tested.

Figure 13:
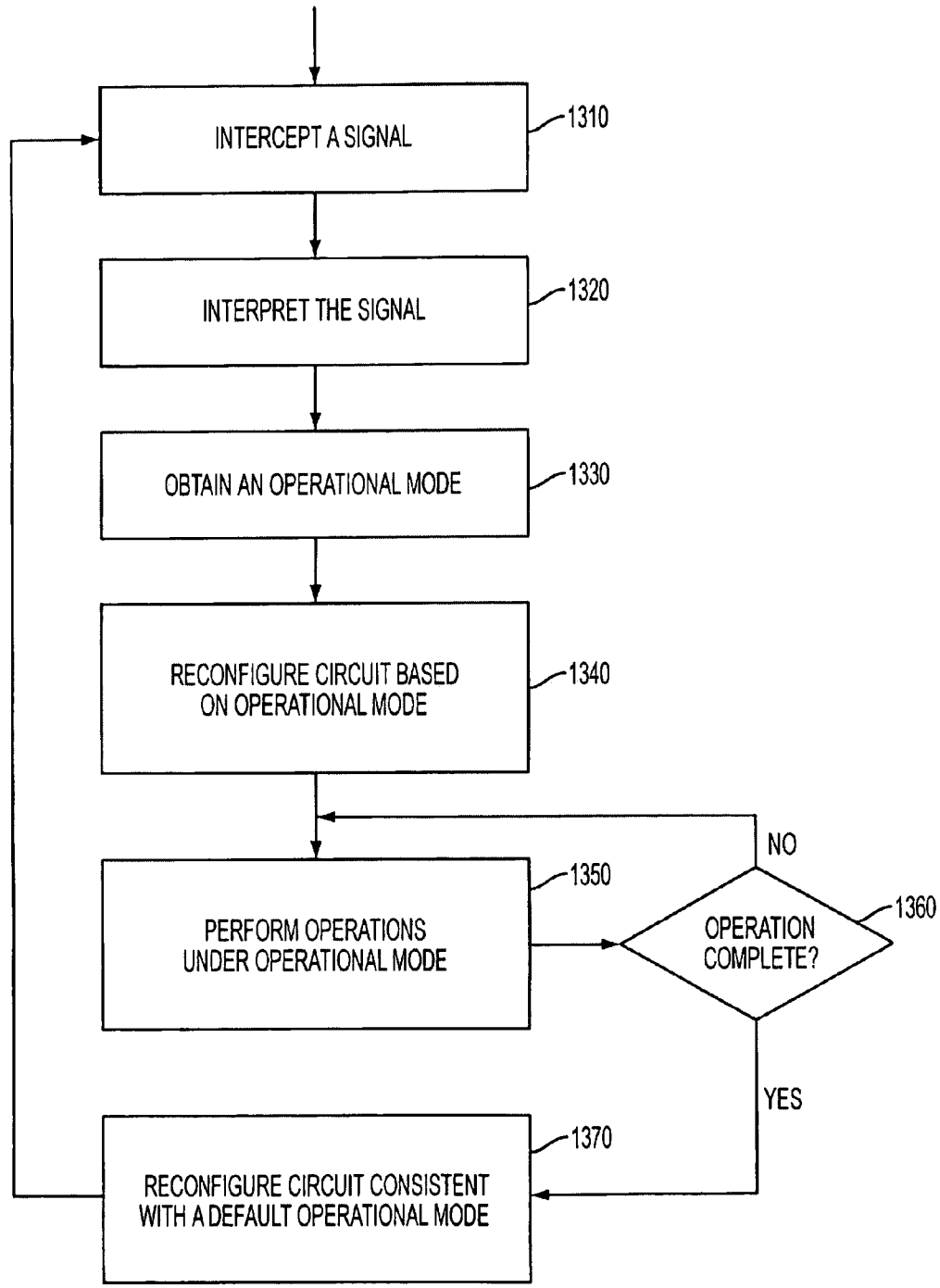
FIG. 13 is a flowchart of an exemplary process, in which a CFC reconfigures its circuitry based on a received signal, facilitating operations consistent with an operational mode derived from the received signal, according to an embodiment of the invention.

FIG. 13 is a flowchart of an exemplary process, in which the CFC 150 reconfigures its circuitry based on a received signal, facilitating operations consistent with an operational mode derived from the received signal, according to an embodiment of the invention. A signal is intercepted by the CFC 150 at 1310. Upon receiving the signal, the CFC 150 interprets the signal at 1320. Information related to an operational mode is then obtained at 1330. Such information may include both the operational mode as well as parameters associated with the operational mode. Based on the information derived from the signal, the CFC 150 reconfigures, at 1340, at least part of its circuit in a manner consistent with the operational mode so that the reconfigured circuit(s) operates to facilitate operations required under the operational mode.

The reconfigured circuit(s) then performs, at 1350, operations consistent with the operational mode. During the operations, the CFC 150 may apply different operational parameters obtained from the signal. Depending on an operational mode, different operations may be performed by the reconfigured CFC 150. For example, if the detected operational mode is a testing mode, the CFC 150 reconfigures itself to perform various operations to facilitate testing one of its coupled cores (ICs). This may include recognizing information contained in the core mode payload packet (e.g., the address of the core to be tested or testing parameters such as the number of test data samples), reconfiguring different circuits accordingly (e.g., reconfiguring clock rate generation circuits and the circuit(s) converting the rate of the test data from the payload to a rate of the core to be tested), and initiating different operations associated with the testing (e.g., sending test data with a converted rate to the core to be tested and receiving a test result from the core and converting the rate prior to sending it out).

Such operations associated with a test mode continue until the underlying testing is completed, which is determined at 1360. Upon completion, the CFC 150 may reconfigure, at 1370, its circuit(s) according to some default operational mode. For example, a default operational mode may correspond to the functional mode 310 (FIG. 3). In this case, the CFC 150 reconfigures it circuits in a manner such that the circuits operate to facilitate the one or more coupled cores (or ICs) to perform functions that they are designed to perform. The default operational mode may be defined based on the functional purposes of the coupled cores. FIGS. 14-21 show an exemplary application of the combination of the CFC 150 with one or more coupled cores in integrated circuits called Network-on-chip (NoC) designed to perform networking operations.

Figure 14:
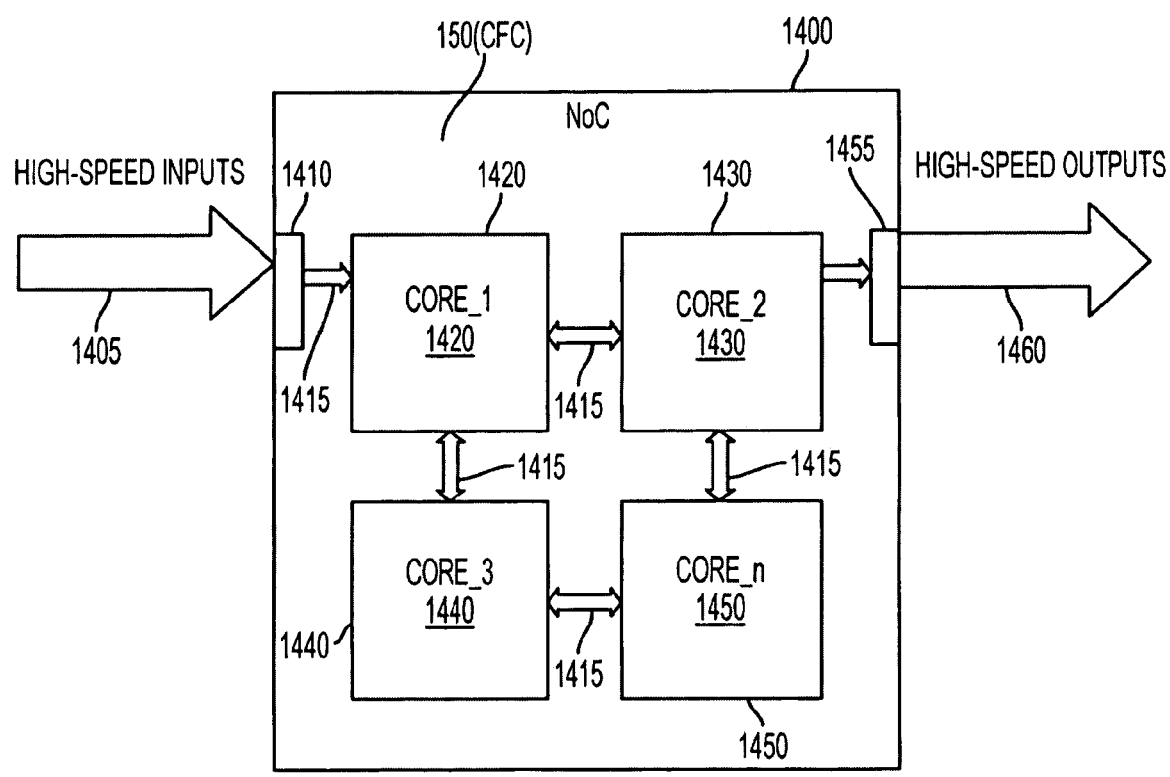
FIG. 14 shows an example of an Network-on-chip (NoC) with high speed input and high speed output.

FIG. 14 shows an example of a Network-on-chip (NoC) 1400 with high speed input and high speed output. The NoC 1400 has an input pin 1405 for high speed input transport and an output pin 1460 for high speed output transport. Within the NoC 1400, there are illustrated four cores, core 1 1420, core 2 1430, core 3 1440, and core 4 1450, that are all interconnected through lower speed interconnections 1415. That is, the NoC 1400 interacts with the outside at a high speed and operates internally at a lower speed. The number of cores included in an NoC may vary.

Figure 15:
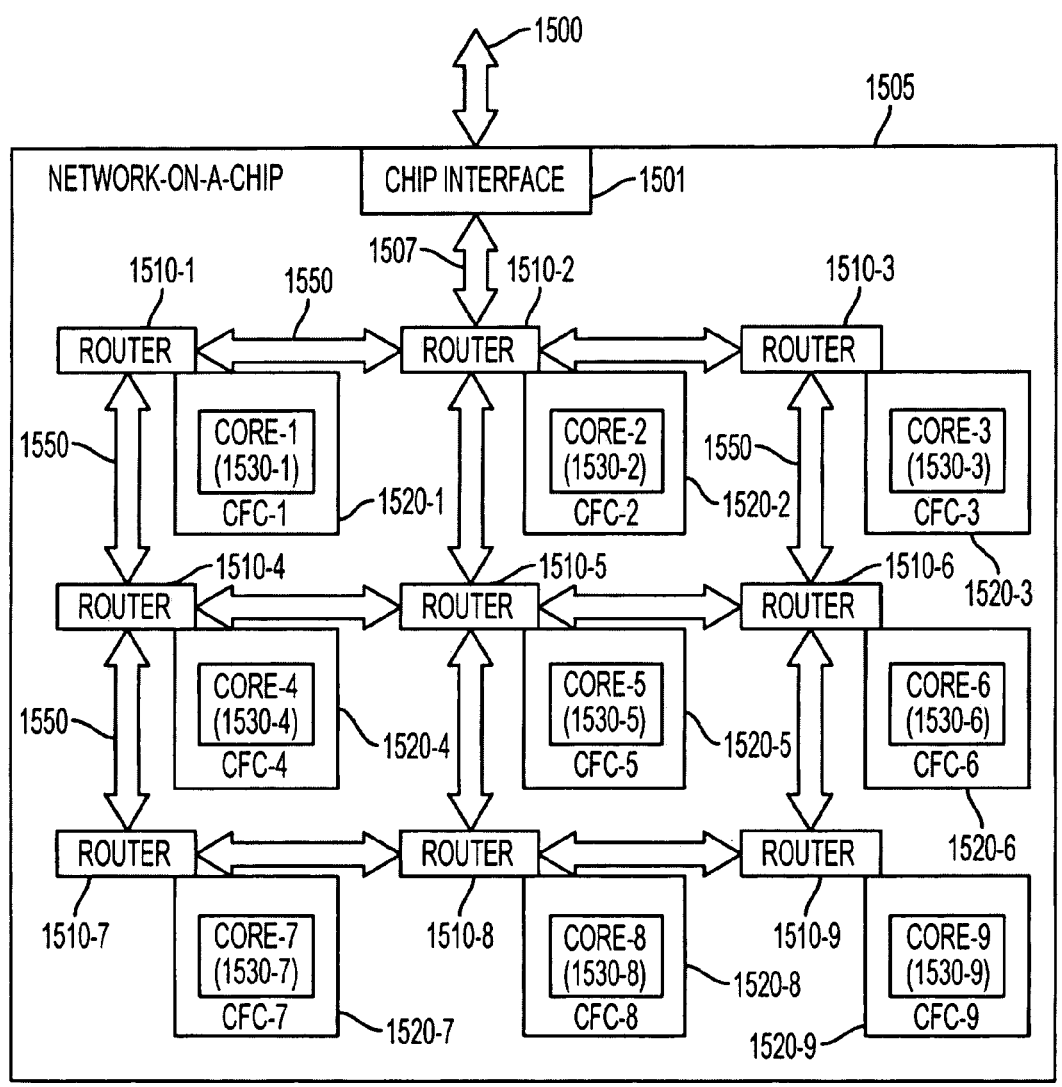
FIG. 15 depicts an arrangement of an NoC with multiple cores each of which is wrapped by a CFC and interconnected with a routing mechanism that delivers information through an internal high speed pathway network, according to an embodiment of the invention.

FIG. 15 depicts an arrangement of an NoC 1505 with multiple cores each of which is wrapped by a CFC and interconnected with a routing mechanism that delivers information through an internal high speed pathway network, according to an embodiment of the invention. The exemplary NoC 1505 comprises a chip interface 1501, a plurality of cores 1530, which are wrapped around by corresponding CFCs 1520, a plurality of routing devices (e.g., illustrated as routers) 1510 that route information via an internal high speed pathway 1550 to different cores through their corresponding CFCs. As shown, in this exemplary embodiment, each core (e.g., 1530-1) interacts with the outside through a corresponding CFC (e.g., 1520-1) coupled thereto, which interfaces with the internal high speed pathway 1550 and a routing device (e.g., 1510-1).

In this exemplary arrangement, information or an input signal is delivered to the chip interface 1501 of the NoC 1505 through an external network pathway 1500 and the chip interface 1501 may then deliver the input signal to a routing device (e.g., 1520-2) that is designated to interface with the chip interface through a special pathway 1507. Upon receiving an input signal, the designated routing device 1520-2 functions as a routing device to deliver information to other routing devices via the internal high speed pathway 1550. Each routing device, upon receiving routed information, may then forward the input signal to a connected CFC and other routing devices via the internal high speed pathway 1550. For example, the routing device 1510-1 may receive an input signal from the routing device 1510-2 and forward the received information to the connected CFC 1520-1 and to other routing devices such as 1510-4 via the internal high speed pathway 1550.

In the arrangement illustrated in FIG. 15, an input signal delivered to the NoC 1505 may be used to make the NoC 1505 perform different tasks based on information contained in the input signal. The NoC 1505 may be designed, under usual situations, to perform functions related to networking and/or network management. For example, a signal delivered to the NoC 1505 may be routed according to address information contained in a header of the signal. In addition, cores associated with each routing device may be utilized to perform various computations to determine, e.g., a strategy in terms of how to route the received information. For instance, policy information may be stored and retrieved to determine how a data stream is to be routed to satisfy certain requirements according to quality of service (QoS) information related to the data stream. Under such normal conditions, each CFC associated with individual cores may be configured to facilitate the coupled cores to perform their designated functions. For example, the CFCs may be configured to intercept input data, convert such data to a desired data rate, forward such converted data to associated core(s), receive output from such core(s), convert such result to an appropriate rate, and deliver such converted result to a routing device to be forwarded further via the internal high speed pathway 1550.

Figure 16:
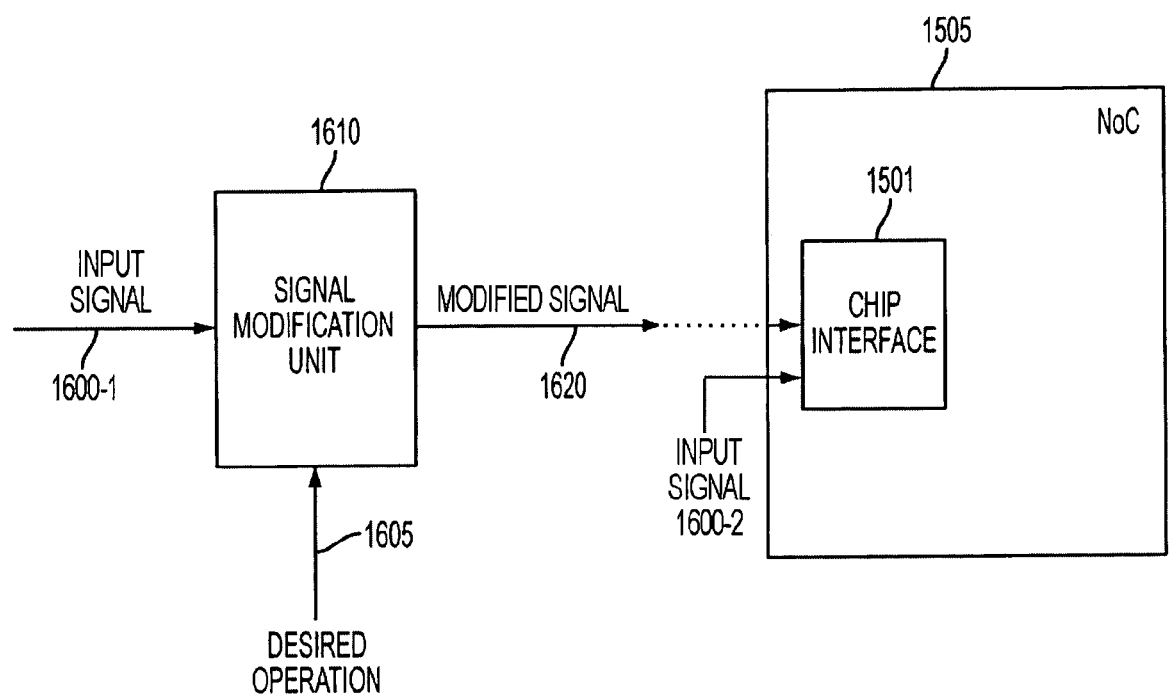
FIG. 16 illustrates a framework in which a network signal is modified to carry control information to be interpreted by a CFC to reconfigure circuitry for carrying out operations consistent with the control information, according to an embodiment of the invention.

There are different operations that may be performed on the NoC 1505. For example, prior to the NoC 1505 being placed in an actual operational scenario, the NoC 1505 may need to be tested or debugged. In addition, during normal operations (e.g., the NoC is in a functional mode), it may be desirable to monitor the NoC's operations and report statistics such as throughput or any problems associated with the operations. A debugging mode may also be applied simultaneously when the NoC is in a functional mode. As discussed above with respect to FIGS. 1-14, these different tasks may be accomplished by revising an input signal to be processed by the NoC 1505 to carry information instructing the CFCs as to the type(s) of operations to be performed. Upon recognizing such information, the CFCs that wrap around the cores may accordingly reconfigure themselves so that the reconfigured circuits may operate to utilize the functions of the cores (e.g., by design) to achieve different goals such as testing a core, debugging a core, monitoring a core, etc. This is illustrated in FIG. 16. An input signal 1600-1 may be revised by a signal modification unit 1610 according to an instruction 1605, describing a desired operation (e.g., a testing operation or a debugging operation) or associated parameters. For example, a network packet may be modified to carry a core mode payload packet as described in FIG. 4. The signal modification unit 1610 may produce a modified signal 1620, which is then delivered to the NoC 1505 through the chip interface 1501. When the modified signal 1620 is received by the CFCs within the NoC 1505, the circuits within each CFC may then be reconfigured according to the information contained in the modified signal 1620 to achieve the desired operation as defined in the instruction 1605.

The information flow from the input signal 1600-1 to the chip interface 1501 of the NoC 1505 may form an active real time streamline in operation. The flow may also be off-line. That is, the modified signal 1620 may be temporarily stored and then applied to one or more NoCs at a later time. The modified signal may also correspond to a product/servioce which may be distributed in a commodity market to different customers and to be used at different logical/physical locations. In addition, the modified signal 1620 may be further modified to incorporate additional information providing instructions for the NoC to conduct operations of different concurrent operational mode(s). Furthermore, it is also possible to provide a signal that incorporates directly instructions to the CFCs within the NoC 1505 without having to modify a signal through the signal modification unit 1610, as described with reference to FIGS. 1-14. For example, the input signal 1610-2 may be designed directly to instruct the NoC 1505 to perform certain operations under one or more operational modes. For instance, a chip manufacturer may supply a signal as input signal 1610-2 directly to the NoC 1505 for testing purpose.

Figure 17:
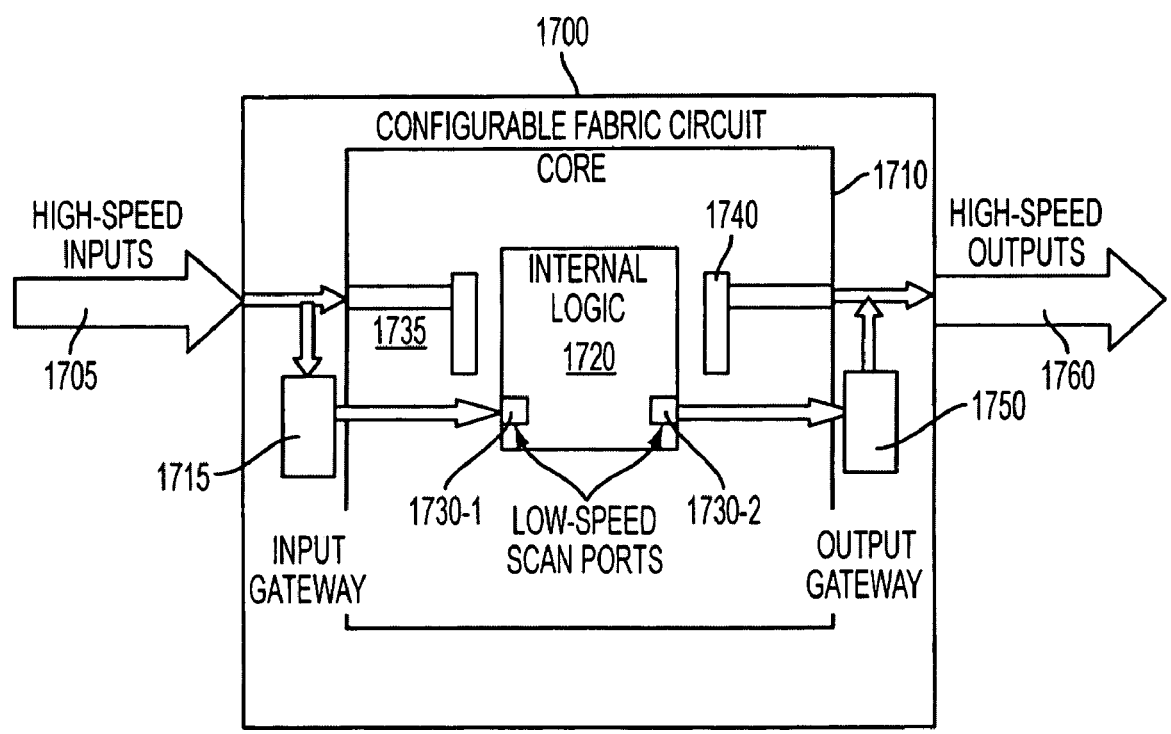
FIG. 17 illustrates an exemplary interconnection between a CFC and one coupled core, according to an embodiment of the inventions.

FIG. 17 illustrates an exemplary interconnection between a CFC 1700 and one coupled core 1710, according to an embodiment of the invention. A modified input signal 1705 enters, at an input speed (e.g., a higher speed), the CFC 1700 that wraps around the core 1710, which may have a portion, e.g., the internal logic 1720, that operates at an internal speed, which may differ from the input speed (e.g., a lower speed). Upon interpreting the modified input signal 1705 (not shown but as described with respect to FIGS. 1-14), the CFC 1700 reconfigures to achieve the instructed operations. For example, it may self-configure circuits to include an input gateway 1715 that converts high speed input 1705 to a signal at the internal speed and forwards data at the internal speed to the low speed input port 1730-1 of the internal logic 1720. In addition, the CFC 1700 may also configure an output gateway 1750 that converts data from the low speed output port 1730-2 of the internal logic 1720 to high speed output 1760. Some part of the core 1710 may operate at a high speed, e.g., parts 1735 and 1740, and the CFC 1700 may also configure part of its circuits that interface with such portions of the core 1710 at a high speed. When the 1700 reconfigures itself, it may also utilize a portion of the core 1710 in combination with a portion of the CFC circuit to form a reconfigured circuit to perform a particular operation.

Figure 18:
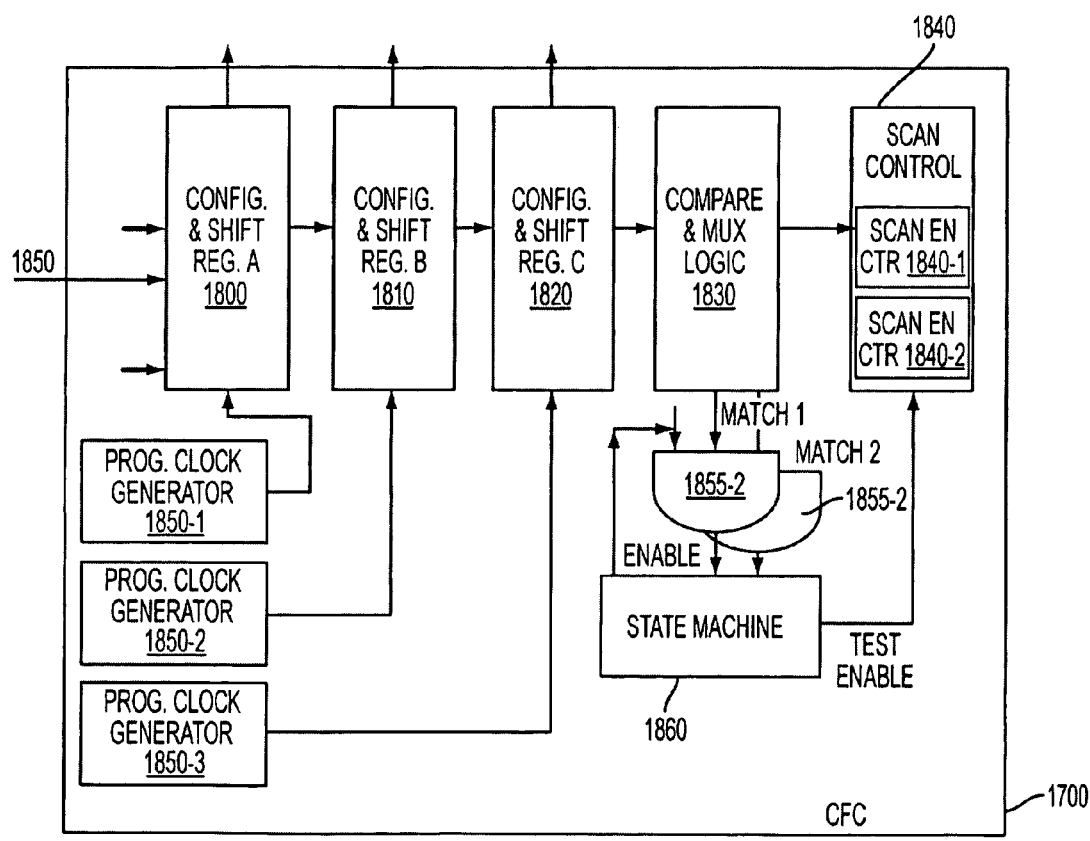
FIG. 18 depicts an exemplary block diagram of some portion of the CFC, according to an embodiment of the invention.

FIG. 18 depicts an exemplary block diagram of some portion of the CFC 1700, according to an embodiment of the invention. The CFC 1700 comprises one or more configurable shifting register banks (e.g., a configurable shifting register bank A 1800, a configurable shifting register bank B 1810, and a configurable shifting register bank C 1820), a comparison & Multiplexer logic circuit 1830, a scan control circuit 1840, one or more programmable clock generators (e.g., 1850-1, 1850-2, and 1850-3), a state machine circuit 1860, and one or more identification circuits (e.g., 1855-1 and 1855-2).

Each configurable shifting bank may be constructed and connected in a similar fashion as shown in FIGS. 6 and 8. As described earlier with respect to FIGS. 6 and 8, when different clock signals of different clock rates are used to control different banks, these banks of registers may be configured to form a circuit that converts data of one speed to data of another speed or a circuit that identifies a certain information (e.g., an address or an operational mode) contained in an input signal. For example, in FIG. 18, a clock signal from 1850-1 may be connected to the configurable shifting register bank A 1800 and a different clock signal from 1850-2 may be connected to the clock signal of the configurable shifting register bank B 1810. When the bank A 1800 is internally configured in the same way as the bank 610 as shown in FIG. 6 and is connected to the bank B 1810 in the same way as shown between banks 610 and 650, the bank A 1800 and the bank 1810 of FIG. 18 form an input gateway that converts an input signal at an input speed to the bank A 1800 to data of a different data rate at the output of the bank B 1810. In another example, the bank C 1820 may be configured to store some pre-determined information, e.g., an address of a coupled core. Such a bank of registers may be configured to connect to another bank of registers to identify the stored information from an input signal. For example, the bank B 1810 may be configured to connect to both the comparison & Multiplexer logic 1830 and to either the bank A 1800 or the bank B 1810 in a similar fashion as shown in FIG. 8 (where the bank 805 in FIG. 8 corresponds to the bank A or B in FIG. 18 and the bank 835 in FIG. 8 corresponds to the bank C 1830 in FIG. 18) to match the pre-stored information with information contained in the input signal in a similar fashion as described with respect to FIG. 8.

When one or more pieces of information needs to be recognized, one or more identification circuits (e.g., 1855-1 and 1855-2) may be configured so that matching signals from the comparison & Multiplexer circuit 1830 may be used to trigger corresponding identification circuit(s), which may output a signal indicating recognition of a specific identification (e.g., a recognized address) and such output signal may be further forwarded to the state machine 1860 which may be configured similarly to the circuit shown in FIG. 9(c) so that a series of events occurring in an ordered sequence may be recognized. Recognition of a series of expected events (e.g., a test mode followed by an address that matches the address of a coupled core) may further trigger, through a, e.g., a test enable signal 1865, the scan control circuit 1840 to initiate a test data scan operation which may be achieved using either the configured circuit 1840-2 that identifies a particular test data with a given pattern number or the configured circuit 1840-1 that obtains one or more pieces of test data from an input signal by parsing a given number of pieces of test data.

Figure 19A:
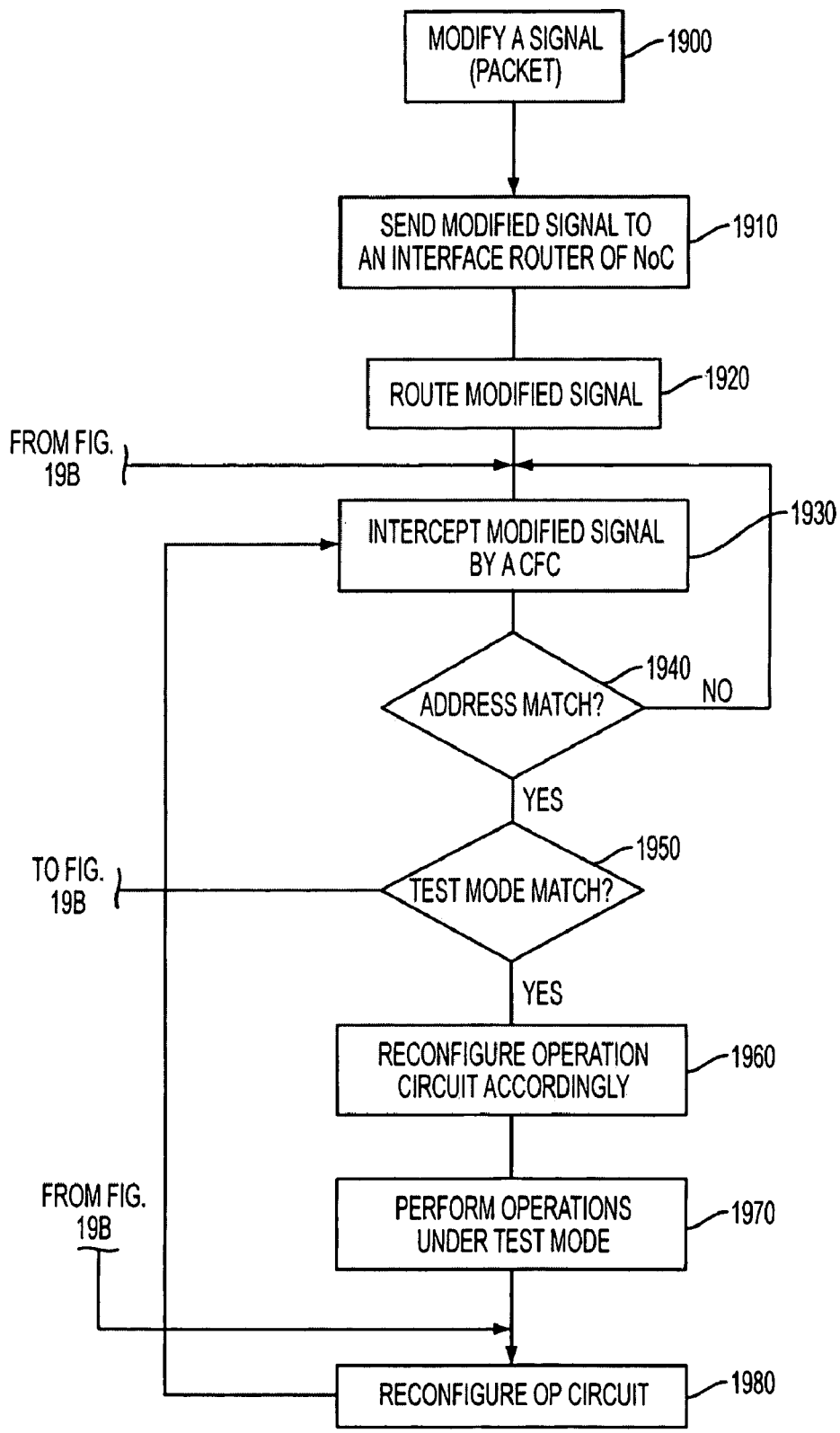
FIG. 19 is a flowchart of an exemplary process in which a network signal is utilized to instruct CFCs in an NoC to reconfigure circuits in order to test one or more cores in the NoC, according to an embodiment of the invention.
Figure 19B:
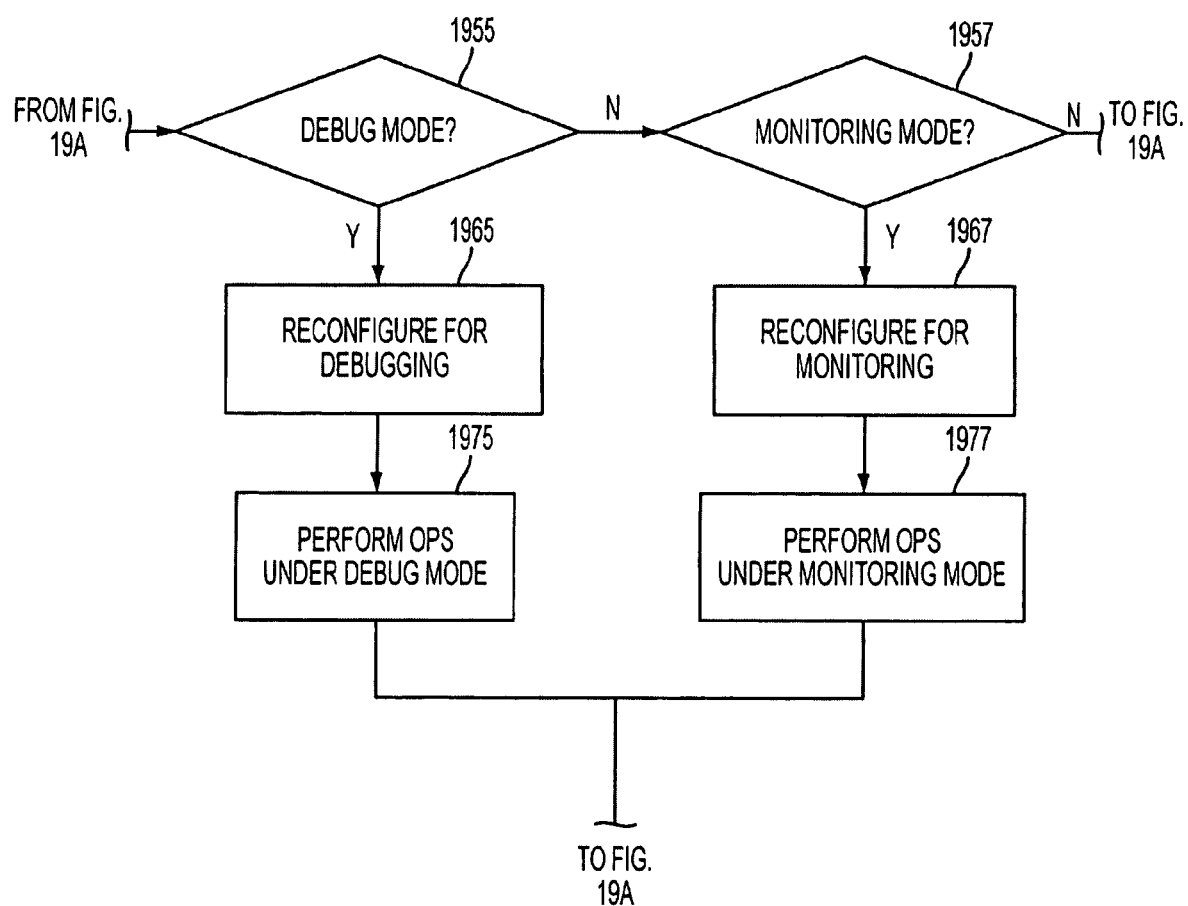

FIG. 19 is a flowchart of an exemplary process in which a network signal is utilized to instruct CFCs in an NoC to reconfigure circuits in order to test one or more cores in the NoC, according to an embodiment of the invention. A network payload is first modified, at 1900, to include a core mode payload packet. The core mode payload packet may be constructed to form a structure determined based on application needs. For example, a test may be performed in a designated manner. That is, each test is directed at a designated core or a designated group of cores (e.g., all the cores associated with a single CFC or all the cores having the same highest bit in their address). In this case, information related to the designation may need to be incorporated in the core mode payload packet.

In different embodiments, a test may also be carried out in a broadcast manner. That is, there is no designated core to be tested. Any CFC that receives a modified signal instructing it to carry out a test may reconfigure its circuits to perform what is instructed. In this case, there may be no need to include an address in the core mode payload packet. In some embodiments, a series of test data is to be delivered to a core to be tested and a test result is collected at the end of the test on all the test data for further analysis. The core mode payload packet may include a parameter indicating the total number of test data patterns included in the packet. The core mode payload packet may alternatively include an end indicator after the test data patterns so that when a CFC recognizes the end indicator signal in the packet, the CFC will stop reading and forwarding the test data to a coupled core.

In other embodiments, a test may also be carried out based on a single piece of test data but such test data may be sent to one or more cores in the NoC in an intermittent manner when the NoC is performing its normal functions. In some embodiments, a series of test data patterns may be sent to an NoC through a different network route so that the test data patterns may not arrive at the NoC in their original order. In this case, each core mode payload packet carrying one test data pattern may also provide a test data pattern identification so that when a CFC receives the core mode payload packet, it may rely on the test data pattern identification to determine how this piece of data is to be used.

The properly modified network payload is then sent, at 1910, to a chip interface 1501 (FIG. 15) of the NoC 1505 to be tested. Upon receiving the modified network payload, the chip interface 1501 forwards the modified payload to a special routing device 1510-2, which then routes the modified network payload to other routing devices via the internal high speed pathway 1550. When the modified payload reaches a routing device (e.g., 1510-1) in the NoC 1505, a corresponding CFC (e.g., 1520-1) connected to the routing device intercepts, at 1930, the modified payload. When the payload contains a core mode payload packet, the CFC identifies information in the payload. For example, the CFC may identify an address and determine, at 1940, whether the address information contained in the payload matches the address of the coupled core. If there is no match, the CFC continues to intercept the next payload.

If there is a match, the CFC further identifies an operational mode from the intercepted payload packet and determines, at 1950, whether the identified operational mode corresponds to a testing mode. If it is a testing mode, the CFC reconfigures, at 1960, its circuits appropriately to facilitate operations to carry out the testing. Tests of related operations are then performed, at 1970, in connection with the core to be tested. Details related to operations during testing a core are discussed with reference to FIG. 20. When a test is completed, the CFC reconfigures itself to facilitate operations in connection with a default operational mode such as the functional mode.

If the operational mode is not a testing mode, as determined at 1950, it is further examined, at 1955, to see whether the identified operational mode corresponds to a debugging mode. If it is a debugging mode, the CFC accordingly re-configures, at 1965, its circuits for performing operations that facilitate debugging the core. Such reconfigured circuits then perform such operations at 1975. At the end of debugging, the CFC reconfigures itself for performing operations in connection with a default operational mode such as the functional mode.

If the operational mode is not a debugging mode, as determined at 1955, it is further examined, at 1957, to see whether the identified operational mode corresponds to a monitoring mode. If it is a monitoring mode, the CFC accordingly re-configures, at 1967, its circuits for performing operations that enable the CFC to monitor the operations perform by the core during its normal operations. Therefore, when it is an operational mode, the core may still operate under a normal functional mode and the CFC may operate under both a functional mode and a monitoring mode. At the end of such a monitoring mode (e.g., the payload packet may provide information related to the duration of the monitoring period), the CFC reconfigures itself for performing operations in connection with the default operational mode such as the functional mode.

Figure 20:
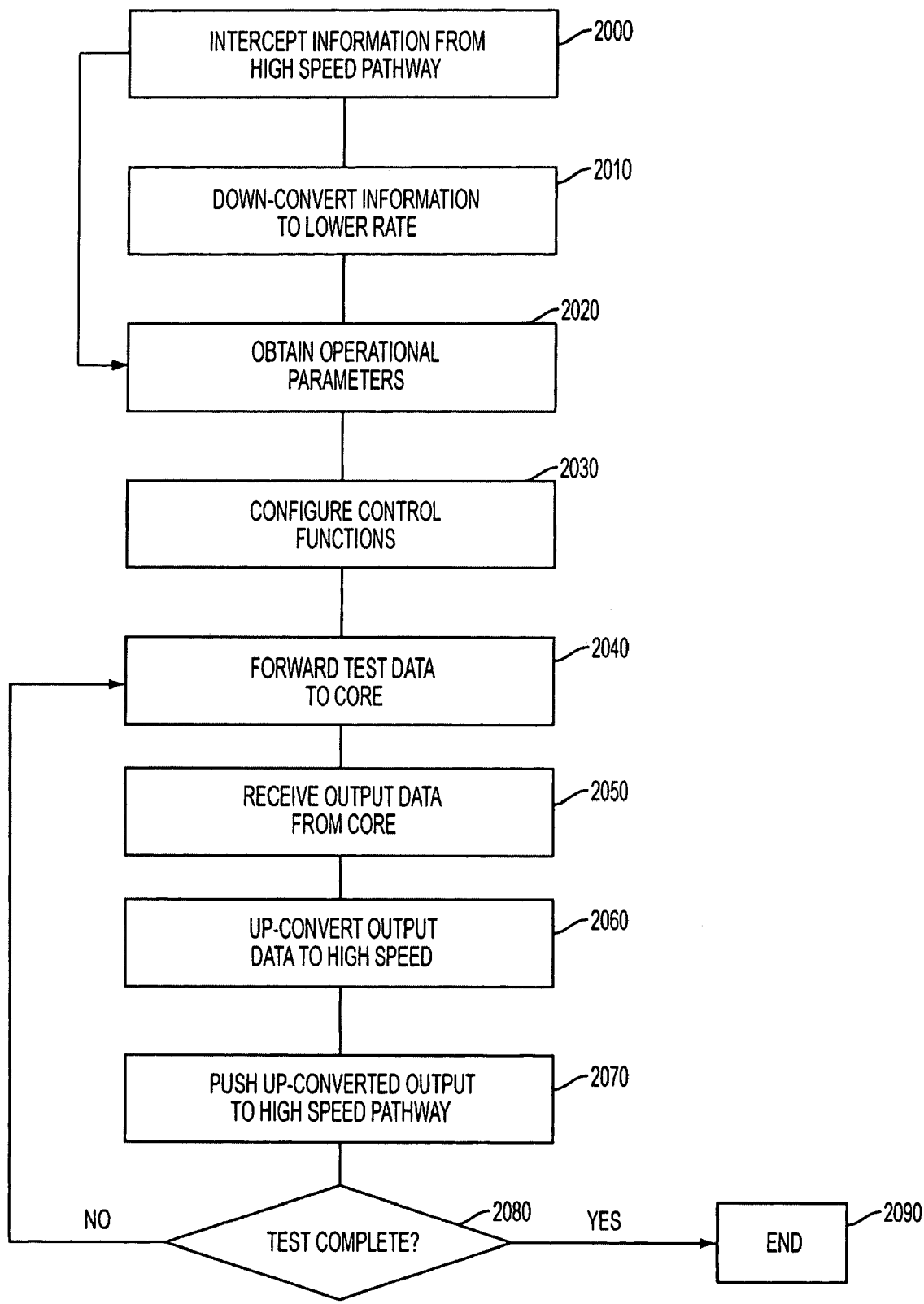
FIG. 20 is a flowchart of an exemplary process, in which a CFC in an NoC performs operations that facilitate a testing of a core coupled therewith, according to an embodiment of the invention.

FIG. 20 is a flowchart of an exemplary process, in which a CFC in an NoC performs operations that facilitate a testing of a core coupled therewith, according to an embodiment of the invention. In some embodiments, the CFC associated with a core to be tested intercepts, at 2000, information contained in a core mode payload packet from an internal high speed pathway. In some embodiments, some of the intercepted information may then be down-converted, at 2010, to a lower speed. For example, information to be used for testing may be converted so that it is consistent with the speed at which a part of the core to be tested operates. Some information may not need to be converted when, for example, the destination core(s) to which such information is to be delivered may operate at a speed similar to the input signal. In this case, the information from the high speed pathway is forwarded directly to 2020.

Various operational parameters associated with a testing mode may then be identified, at 2020 from the intercepted information. Based on such parameters, the CFC configures, accordingly, some of the circuits at 2030. For example, when a parameter relating to a test data count is obtained, a circuit designated to count the number of test data patterns intercepted may be reconfigured so that it controls the scanning of test data according to the given count. A core mode payload packet may also contain information that is not related to operational parameters or that is used in configuring CFC circuits. For example, a core mode payload packet for testing a NoC may carry test data itself. When the information intercepted corresponding to such data, it is forwarded, at 2040, to the destination core. When the core receives the test data, certain processing may be carried out in a manner based on the nature of the test data and such processing may yield a result, which corresponds to a test result. The core then sends the test result back to the core. Upon receiving, at 2050, the output or test result from the core, the CFC may up-convert, at 2060, the test result to produce high speed data before the CFC pushes, at 2070, the high speed output to the internal high speed pathway 1550 (FIG. 15). Such test result will then be routed, via the routing devices in the NoC 1505, to the chip interface 1501 and then sent outside of the NoC so that such test result can be analyzed. When the test is completed, determined at 2080, the process ends at 2090. If not, the process may return to 2040 to forward another test data to the core.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. An integrated circuit, comprising: a configurable fabric circuit (CFC) including an interpreting circuit, interfaced with one or more core circuits, wherein the CFC is capable of reconfiguring logic circuit therein in accordance with an operational mode determined based on interpretation of a received signal by said interpreting circuit to facilitate the one or more core circuits to carry out an operation consistent with the operational mode.

2. The integrated circuit of claim 1, wherein the CFC comprises: an intercepting circuit capable of intercepting the received signal at a first speed; said interpreting circuit capable of interpreting the received signal, including recognizing the operational mode; a re-configuring circuit capable of dynamically configuring the CFC according to the operational mode; and an operation circuit, configured by the re-configuring circuit, capable of performing one or more functions consistent with the operational mode.

3. The integrated circuit of claim 1, wherein the operational mode includes at least one of a functional mode, a testing mode, a debug mode, a monitoring mode, a power control mode, and a clock control mode.

4. The integrated circuit of claim 1, wherein the received signal includes a network payload.

5. The integrated circuit of claim 4, wherein the network payload includes a core mode payload packet having information associated with the operational mode and to be used to carry out the operation under the operational mode.

6. The integrated circuit of claim 5, wherein the core mode payload packet includes at least one of: a first field indicating the operational mode; a second field having information addressing one or more destination cores that are designated to perform the operation under the operational mode; a third field providing one or more operational parameters associated with the operational mode; and a fourth field providing data to be applied to the one or more destination cores.

7. The integrated circuit of claim 6, wherein when the operational mode is a test mode, the one or more operational parameters include one of: a count representing the number of test samples to be applied to the destination cores; a test sample number identifying a test sample to be applied to the destination cores.

8. The integrated circuit of claim 2, wherein the intercepting circuit comprises: an input gateway circuit configured to convert the received signal at the first speed into a second signal; and a control circuit configured to direct the second signal to a destination.

9. The integrated circuit of claim 8, wherein the input gateway circuit comprises: at least one bank of first type of registers configured to transform the received signal at the first speed to produce a transformed signal; and at least one bank of second type of registers configured to receive the transformed signal to produce the second signal.

10. The integrated circuit of claim 9, wherein the received signal is a serial signal; the transformed signal is a shifted signal produced by shifting the received signal; and the second signal is a parallel signal.

11. The integrated circuit of claim 8, wherein the destination includes the interpreting circuit.

12. The integrated circuit of claim 8, wherein the control circuit is capable of directing the second signal to a destination determined based on information received from the interpreting circuit.

13. The integrated circuit of claim 8, wherein the control circuit directs the second signal to an interfaced core upon receiving the information from the interpreting circuit.

14. The integrated circuit of claim 2, wherein the interpreting circuit comprises: an identification circuit capable of recognizing certain information included in the received signal; and a recognition result delivery circuit capable of directing the certain information recognized.

15. The integrated circuit of claim 14, wherein the identification circuit comprises: an address identification circuit capable of recognizing an address included in the received signal and directed at one or more interfaced cores that are addressable; and an operational mode identification circuit capable of recognizing the operational mode from the received signal.

16. The integrated circuit of claim 15, wherein the identification circuit further comprises an operational parameter recognition circuit capable of obtaining, from the received signal, one or more operational parameters associated with the operational mode.

17. The integrated circuit of claim 16, wherein the one or more operational parameters include a first number representing a count of data samples.

18. The integrated circuit of claim 17, wherein the one or more operational parameters include a second number representing a length of each data sample.

19. The integrated circuit of claim 17, wherein the one or more operational parameters include a third number representing an identifier of a data sample.

20. The integrated circuit of claim 17, wherein the one or more operational parameters include a data sample.

21. The integrated circuit of claim 16, wherein the identification circuit receives the second signal from the intercepting circuit at a second speed.

22. The integrated circuit of claim 16, wherein at least one of the operational parameters is sent to the operation circuit.

23. The integrated circuit of claim 15, wherein the address identification circuit comprises: a comparison circuit configured to compare at least one portion of the received signal with an existing address information associated an interfaced core circuit to produce a first state enabling signal; and a state machine circuit configured to tansit from a first state to a second state upon the first state enable signal to signify that a match is found between the at least one portion of the received signal and the existing address information.

24. The integrated circuit of claim 23, wherein the state machine circuit is further configured to transit from the second state to a third state upon a second state enable signal from the operational mode identification circuit, wherein the transition to the third state causes an output to be produced indicating a recognized sequence of events comprising a recognized operational mode and a matched address.

25. The integrated circuit of claim 2, wherein the operation circuit is capable of interfacing with a core at a second speed when the core operates at the second speed.

26. The integrated circuit of claim 25, wherein the operation circuit, if configured when the operational mode is a test mode, comprises: a data sample scan control circuit configured to control the number of units to be intercepted for each data sample by the intercepting circuit and to be delivered to an interfaced core circuit.

27. The integrated circuit of claim 26, wherein the operation circuit further comprises, in the test mode, a data unit counting circuit configured to control the number of data samples to be intercepted.

28. The integrated circuit of claim 26, wherein the operation circuit further comprises, in the test mode, a data sample ID recognition circuit configured to recognize a data sample identification associated with a data sample directed to a core circuit interfaced with the CFC.

29. The integrated circuit of claim 26, wherein the operation circuit further comprises, in the test mode, an end signal recognition circuit configured to recognize a test end signal included in the received signal and to signal the re-configuring circuit for re-configuring the CFC accordingly.

30. The integrated circuit of claim 26, wherein the operation circuit further comprises: a first clock generation circuit configured to generate a first clock at the first speed at which the received signal is intercepted and is directed; and optionally, a second clock generation circuit configured to generate a second clock at a second speed at which a second signal is generated by and is directed to at least one of the interfaced core circuits and/or at least one part of the CFC.

31. The integrated circuit of claim 30, wherein the CFC further comprises an output gateway circuit configured to receive a third signal, at the second speed, from an interfaced core circuit and to convert the third signal into an output signal at the first speed, where the third signal is generated as a response to the received signal.

32. The integrated circuit of claim 1, further comprising: one or more additional CFCs, each of which interfaces with one or more additional cores, capable of reconfiguring logical circuits contained therein in accordance with the operational mode included in the received signal; and a plurality of devices, interconnected with the CFC and the one or more additional CFCs via pathways and directing the received signal to the one or more circuit cores and one or more additional cores through their corresponding CFCs.

33. The integrated circuit of claim 32, further comprising an interface circuit capable of obtaining the received signal and directing the received signal to at least one of the devices.

34. The integrated circuit of claim 33, wherein the devices include routers, capable of routing, via the pathways, the received signal with information indicating a destination core to a CFC associated with the destination core.

35. A Network-on-chip (NoC), comprising: a plurality of cores; a plurality of routing circuits configured to route information to the plurality of cores; and an information transport pathway connecting the routing circuits, wherein each of the cores is coupled with at least one configurable fabric circuit (CFC) and interfaces with at least one of the routing circuits through a coupled CFC, and each CFC is capable of reconfiguring logic circuit therein in accordance with an operational mode determined based on a signal routed by the routing circuits to facilitate a coupled integrated circuit core to carry out an operation consistent with the operational mode.

36. The NoC of claim 35, further comprising an interface circuit capable of intercepting the signal from outside of the NoC and passing the signal to at least one of the routing circuits.

37. The NoC of claim 35, wherein each CFC comprises: an intercepting circuit capable of intercepting the signal; an interpreting circuit capable of interpreting the signal, including recognizing the operational mode; a re-configuring circuit capable of dynamically configuring the CFC according to the operational mode; and an operation circuit, configured by the re-configuring circuit, capable of performing one or more functions to facilitate a coupled core to carry out the operation consistent with the operational mode.

38. The NoC of claim 37, wherein the operational mode includes at least one of a functional mode, a testing mode, a debug mode, a monitoring mode, a power control mode, and a clock control mode.

39. The NoC of claim 37, wherein the signal includes a network payload.

40. The NoC of claim 39, wherein the network payload includes a core mode payload packet having information associated with the operational mode and information necessary to carry out the operation under the operational mode.

41. The NoC of claim 40, wherein the core mode payload packet includes at least one of: a first field indicating the operational mode; a second field having information addressing one or more destination cores that are designated to perform the operation under the operational mode; a third field providing one or more operational parameters associated with the operational mode; and a fourth field providing data to be applied to the one or more destination cores.

42. A method, comprising: providing an integrated circuit; generating a signal that can be interpreted and/or acted upon by the integrated circuit; sending the signal to the integrated circuit so that, upon interpreting the signal, the integrated circuit performs an operation in accordance with an operational mode embedded in the signal, wherein the integrated circuit comprises: one or more core circuits, each of which is coupled with a configurable fabric circuit (CFC) that is capable of reconfiguring logic circuit therein based on the operational mode determined from the signal to facilitate a coupled core circuit to perform the operation consistent with the operational mode.

43. The method of claim 42, wherein the generating the signal includes modifying an original signal, which can be interpreted and/or acted upon by the integrated circuit, to embed information instructing the integrated circuit to perform the operation under the operational mode.

44. The method of claim 42, wherein the operational mode includes at least one of a functional mode, a testing mode, a debug mode, a monitoring mode, a power control mode, and a clock control mode.

45. The method of claim 42, wherein each CFC is capable of: intercepting the signal; interpreting the signal, including recognizing the operational mode; dynamically configuring at least a portion of the CFC according to the operational mode; and performing one or more functions to facilitate a coupled core to carry out the operation consistent with the operational mode.

46. The method of claim 42, wherein the signal includes a network payload.

47. The method of claim 46, wherein the network payload includes a core mode payload packet having information associated with the operational mode and information necessary to carry out the operation under the operational mode.

48. The method of claim 47, wherein the core mode payload packet includes information related to one or more operational modes, for each of which, the core mode payload packet includes at least one of: a first field indicating the operational mode; a second field having information addressing one or more destination cores that are designated to perform an operation under the operational mode; a third field providing one or more operational parameters associated with the operational mode; and a fourth field providing data to be applied to the one or more destination cores.

49. A method, comprising: providing a Network-on-Chip (NoC); generating a signal that can be processed by the NoC; sending the signal to the NoC so that the NoC, upon processing the signal, performs an operation in accordance with an operational mode embedded in the signal, wherein the NoC comprises: a plurality of cores, each of which is coupled with a configurable fabric circuit (CFC) that is capable of interpreting the signal and reconfiguring logic circuit therein based on the operational mode determined from the signal to facilitate a coupled core to perform the operation consistent with the operational mode, a plurality of routing circuits, interconnected via information transport pathways, capable of routing the signal to the cores through the coupled CFCs.

50. The method of claim 49, wherein the generating the signal includes modifying an original signal, which can be interpreted and/or acted upon by the CFCs, to embed information instructing one or more cores in the NoC to perform the operation under the operational mode.

51. The method of claim 49, wherein the operational mode includes at least one of a functional mode, a testing mode, a debug mode, a monitoring mode, a power control mode, and a clock control mode.

52. The method of claim 49, wherein each CFC is capable of: intercepting the signal transported by the routing circuits via the transport pathways; interpreting the signal, including recognizing the operational mode; dynamically configuring at least a portion of the CFC according to the operational mode; and performing one or more functions to facilitate a coupled core to carry out the operation consistent with the operational mode.

53. The method of claim 49, wherein the signal includes a network payload.

54. The method of claim 53, wherein the network payload includes a core mode payload packet having information associated with the operational mode and information necessary to carry out the operation under the operational mode.

55. The method of claim 54, wherein the core mode payload packet includes information related to one or more operational modes, for each of which, the core mode payload packet includes at least one of: a first field indicating the operational mode; a second field having information addressing one or more destination cores that are designated to perform the operation under the operational mode; a third field providing one or more operational parameters associated with the operational mode; and a fourth field providing data to be applied to the one or more destination cores.

56. An integrated circuit, comprising: a configurable fabric circuit (CFC) interfaced with one or more core circuits, wherein the CFC is capable of reconfiguring logic circuit therein in accordance with an operational mode determined based on a received signal to facilitate the one or more core circuits to carry out an operation consistent with the operational mode, wherein the received signal includes a network payload, wherein the network payload includes a core mode payload packet having information associated with the operational mode and to be used to carry out the operation under the operational mode, and wherein the core mode payload packet includes at least one of: a first field indicating the operational mode; a second field having information addressing one or more destination cores that are designated to perform the operation under the operational mode; a third field providing one or more operational parameters associated with the operational mode; and a fourth field providing data to be applied to the one or more destination cores.

57. The integrated circuit of claim 56, wherein when the operational mode is a test mode, the one or more operational parameters include one of: a count representing the number of test samples to be applied to the destination cores; a test sample number identifying a test sample to be applied to the destination cores.

* * * * *